(12) United States Patent
Adamovsky et al.

(10) Patent No.: US 9,291,774 B1
(45) Date of Patent: Mar. 22, 2016

(54) POLARIZATION DEPENDENT WHISPERING GALLERY MODES IN MICROSPHERES

(75) Inventors: Grigory Adamovsky, Solon, OH (US); Susan Y. Wrbanek, Sheffield Village, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 525 days.

(21) Appl. No.: 13/476,470

(22) Filed: May 21, 2012

Related U.S. Application Data

(60) Provisional application No. 61/488,348, filed on May 20, 2011.

(51) Int. Cl.
G02B 6/26 (2006.01)
G02B 6/293 (2006.01)
G02B 6/27 (2006.01)

(52) U.S. Cl.
CPC .......... *G02B 6/29341* (2013.01); *G02B 6/2706* (2013.01)

(58) Field of Classification Search
None
See application file for complete search history.

(56) References Cited

U.S. PATENT DOCUMENTS

| | | | |
|---|---|---|---|
| 5,039,192 A * | 8/1991 | Basu | 385/31 |
| 7,174,064 B2 * | 2/2007 | Sayyah et al. | 385/15 |
| 7,218,803 B1 * | 5/2007 | Sumetsky | 385/12 |
| 7,957,617 B2 * | 6/2011 | Vollmer et al. | 385/39 |
| 2002/0018617 A1 * | 2/2002 | Iltchenko et al. | 385/28 |
| 2003/0021518 A1 * | 1/2003 | Smirnov et al. | 385/15 |
| 2005/0025199 A1 * | 2/2005 | Ma | 372/20 |
| 2010/0118375 A1 * | 5/2010 | Maleki et al. | 359/239 |
| 2011/0306854 A1 * | 12/2011 | Arnold et al. | 600/310 |

FOREIGN PATENT DOCUMENTS

FR 2739195 A1 * 3/1997

OTHER PUBLICATIONS

P. Bianucci et al. Polarization conversion in a silica microsphere. Optics Express, 15:11:7000-7005, May 28, 2007.*
N. Das et al. Investigation of a Micro-Optical Species Concentration Sensor Concept Based on Whispering Galley [sic] Mode Resonators. 45th AIAA Aerospace Sciences Meeting and Exhibit, Jan. 8-11, 2007.*
H. Konishi et al. Polarization-discriminated spectra of a fiber-microsphere system. Applied Physics Letters, 89:121107-1-121107-3, Sep. 2006.*

(Continued)

*Primary Examiner* — Mike Stahl
(74) *Attorney, Agent, or Firm* — Robert H. Earp, III

(57) ABSTRACT

A tunable resonant system is provided and includes a microsphere that receives an incident portion of a light beam generated via a light source, the light beam having a fundamental mode, a waveguide medium that transmits the light beam from the light source to the microsphere, and a polarizer disposed in a path of the waveguide between the light source and the microsphere. The incident portion of the light beam creates a fundamental resonance inside the microsphere. A change in a normalized frequency of the wavelength creates a secondary mode in the waveguide and the secondary mode creates a secondary resonance inside the microsphere.

20 Claims, 38 Drawing Sheets

(56) References Cited

OTHER PUBLICATIONS

A. Chiba et al. Fano resonance in a multimode tapered fiber coupled with a microspherical cavity. Applied Physics Letters, 86:261106-1-261106-3, Jun. 2005.*

M.J. Humphrey et al. Calculation of optimal fiber radius and whispering-gallery mode spectra for a fiber-coupled microsphere. Optics Communications, 271:124-131, 2007.*

* cited by examiner

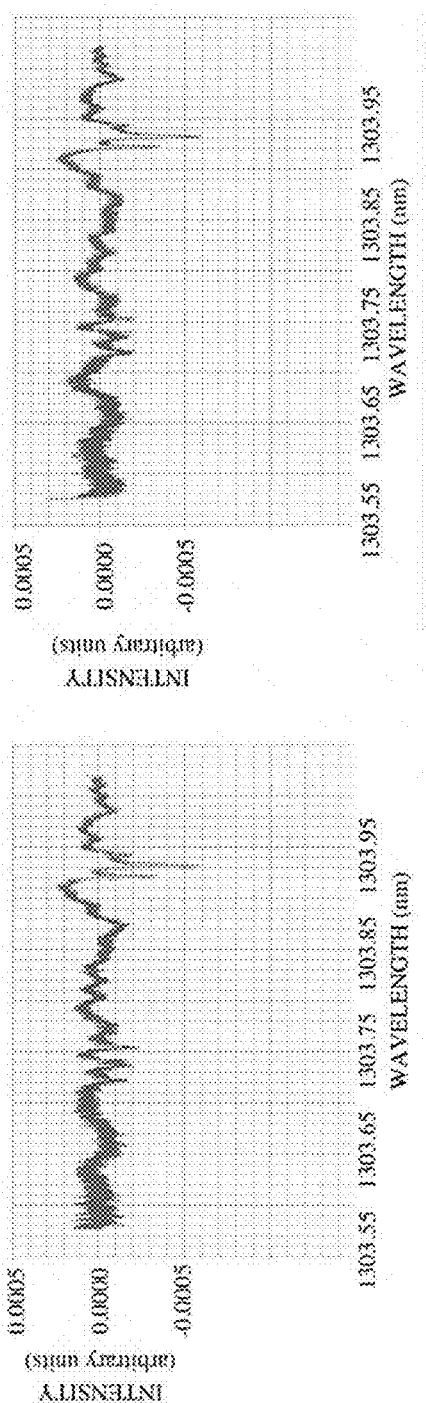
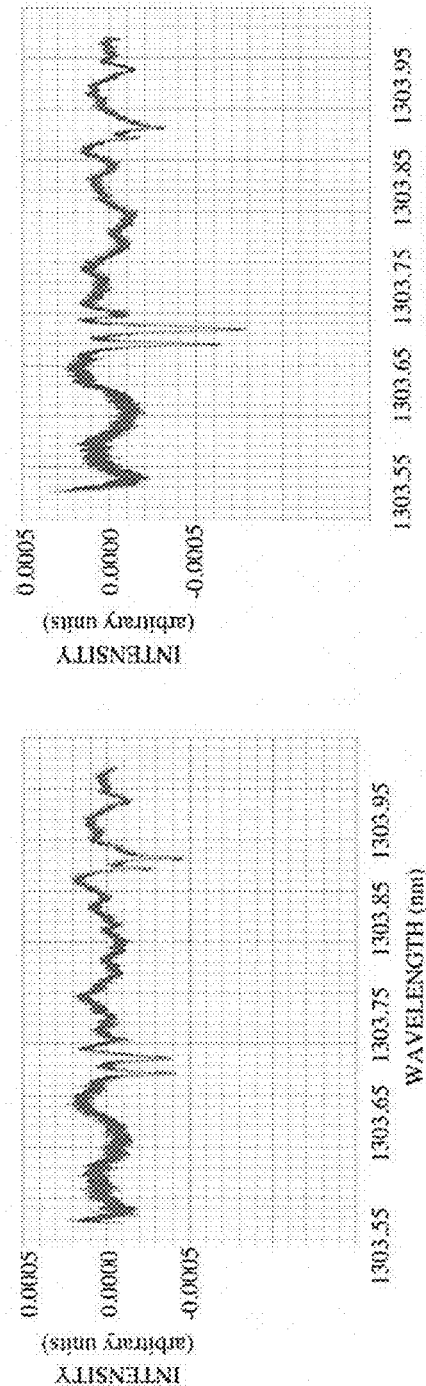
FIG. 15A

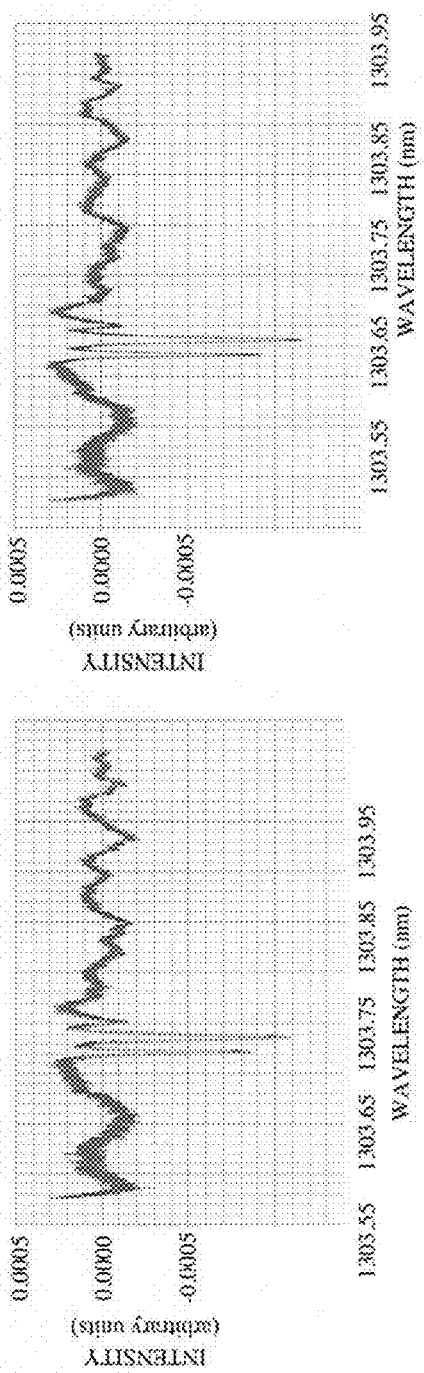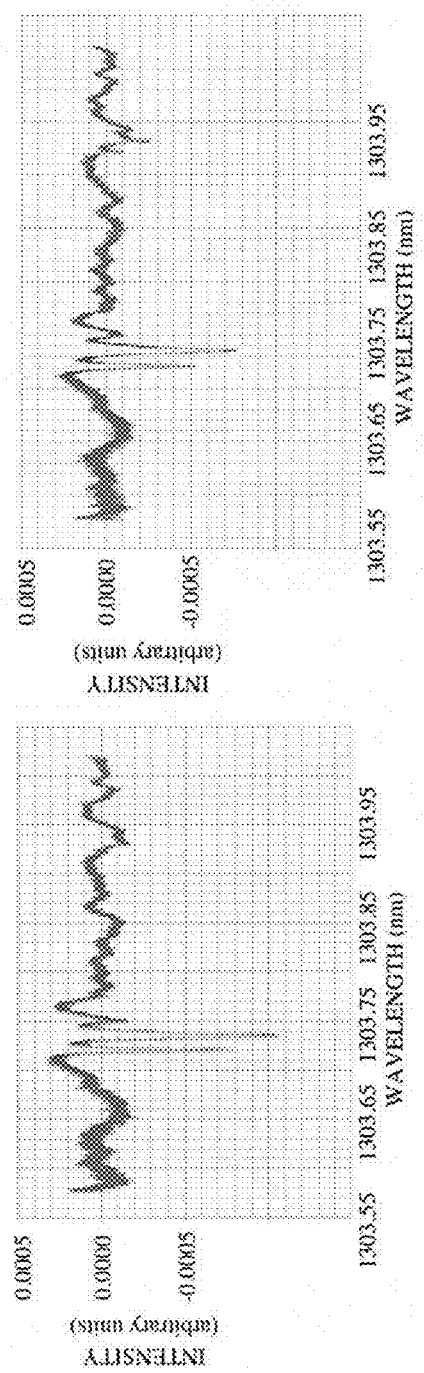
FIG. 15B

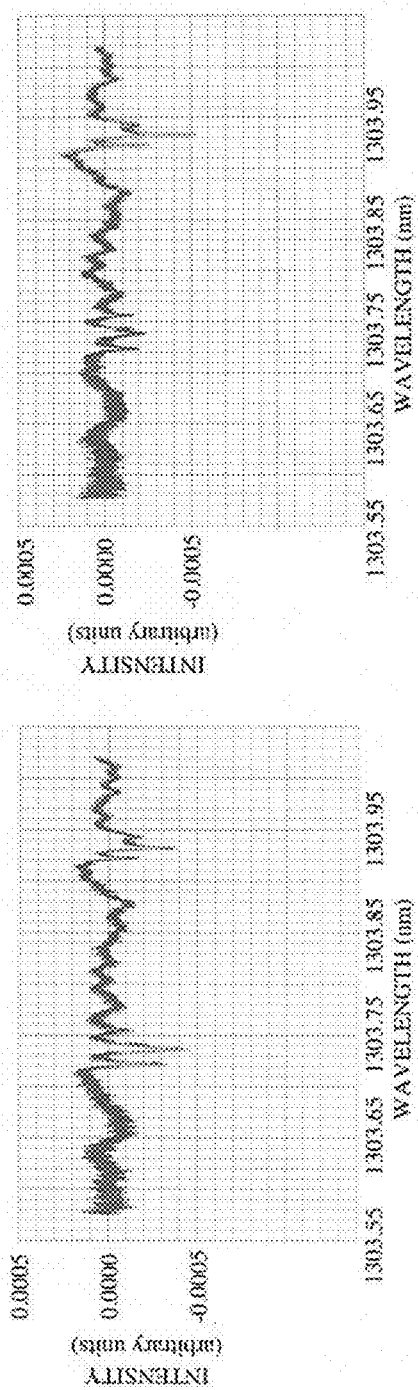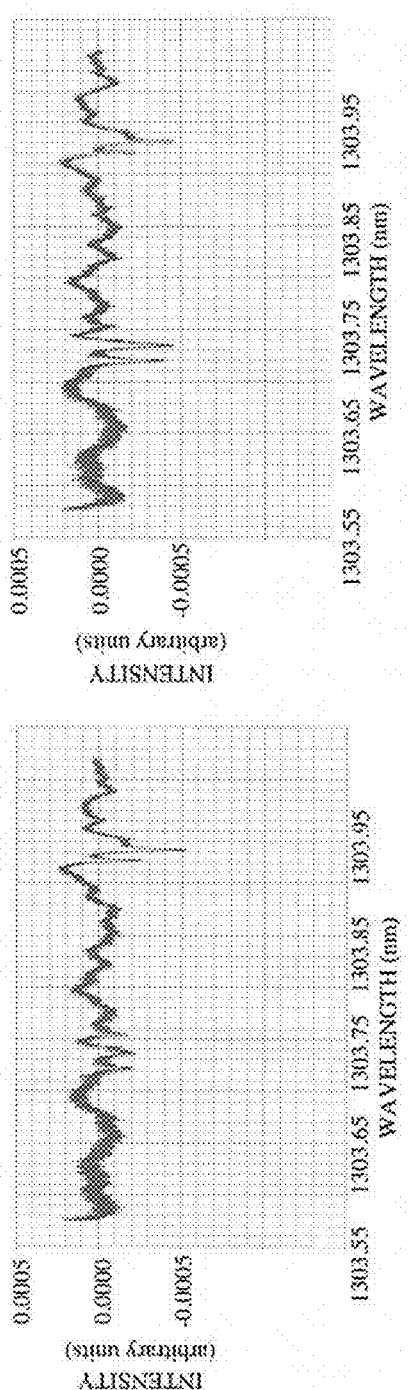
FIG. 15C

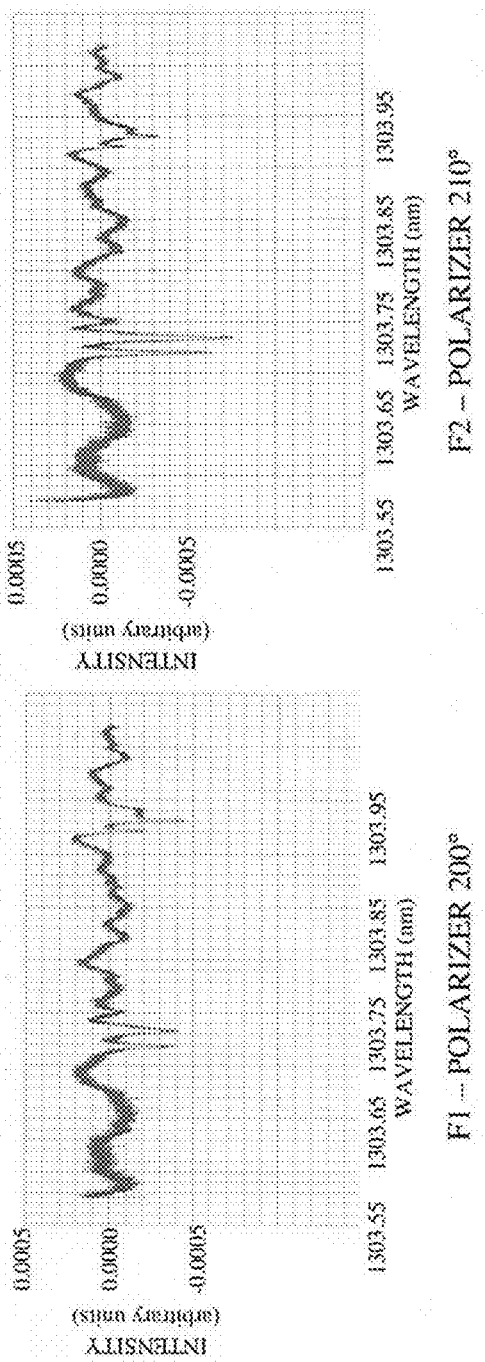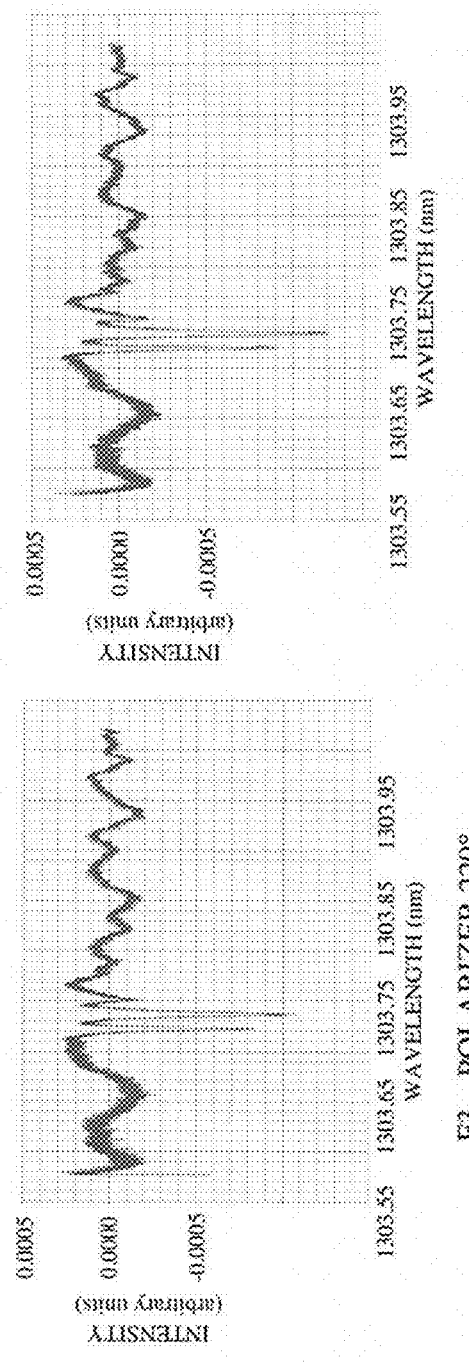
FIG. 15F

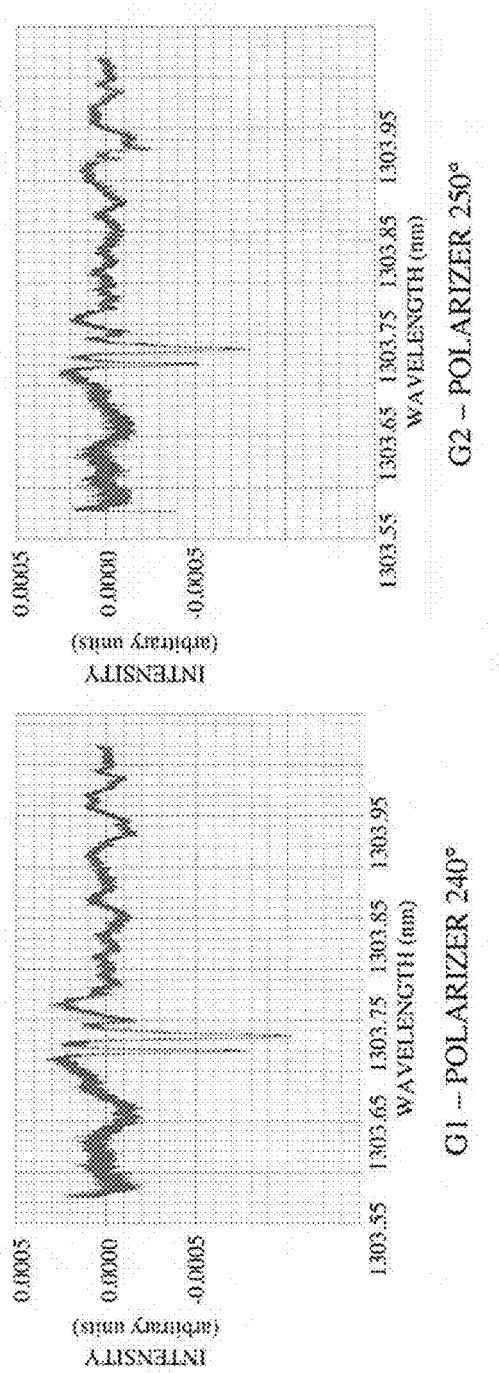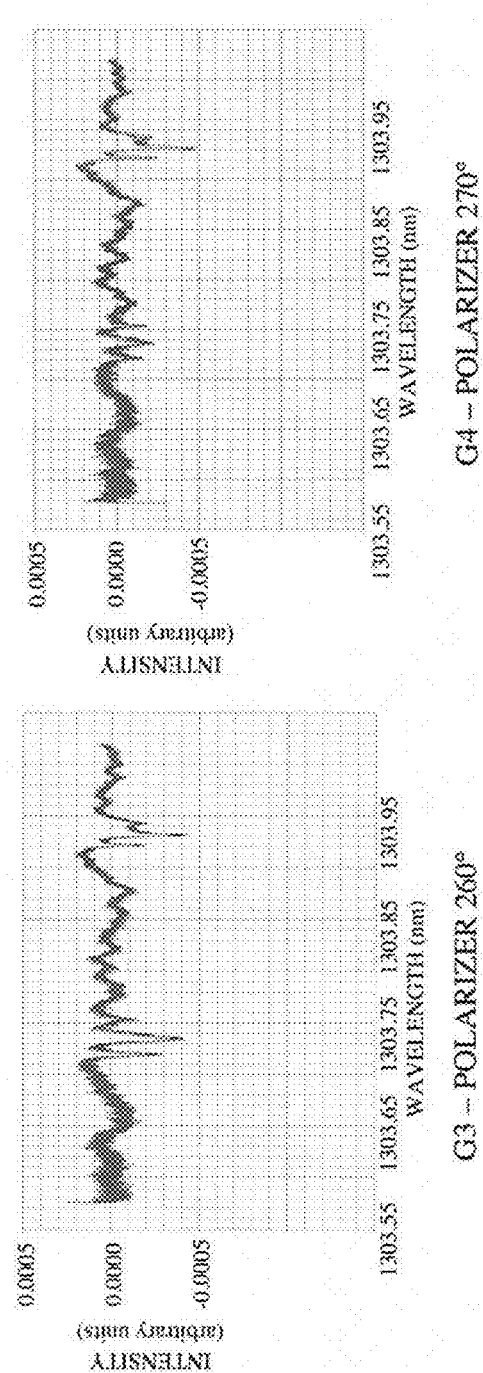
FIG. 15G

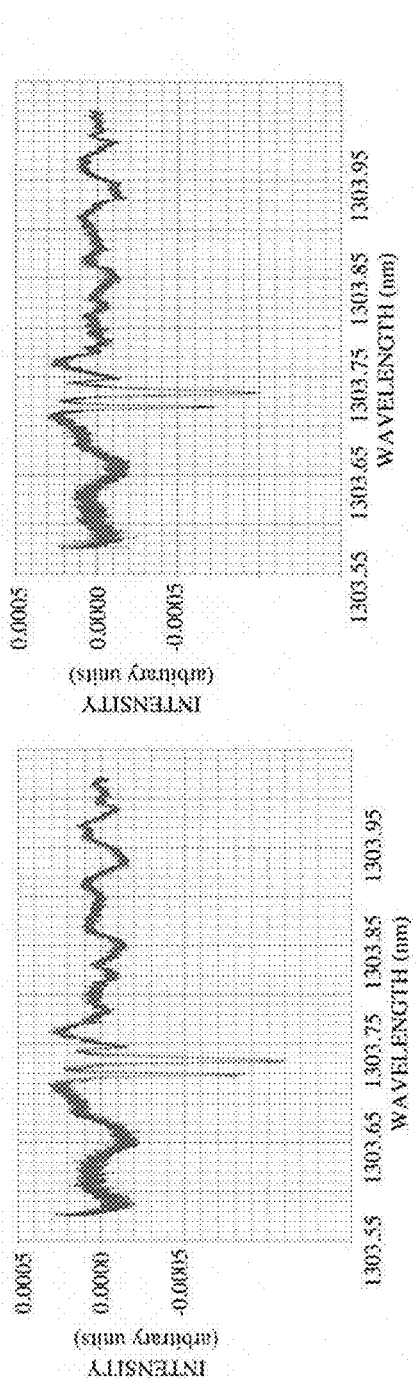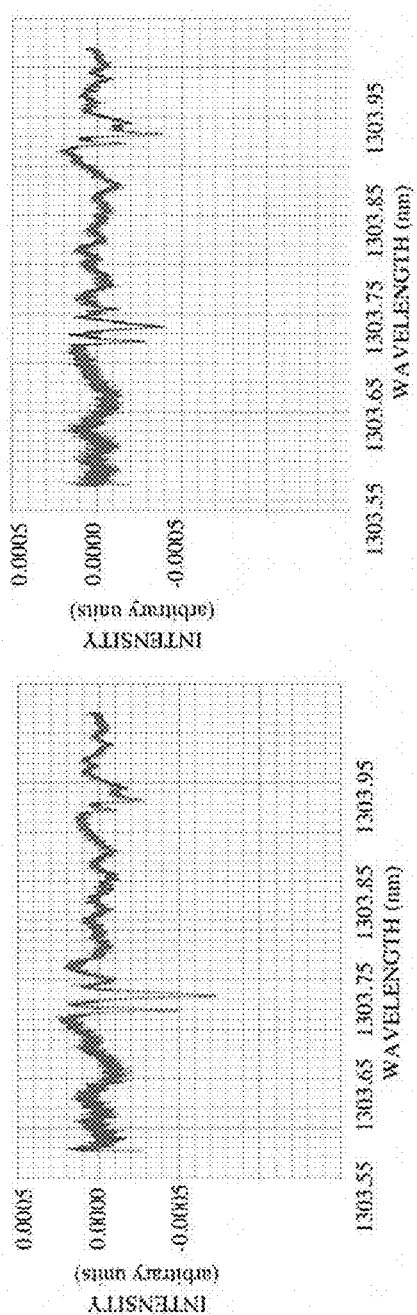
FIG. 15I

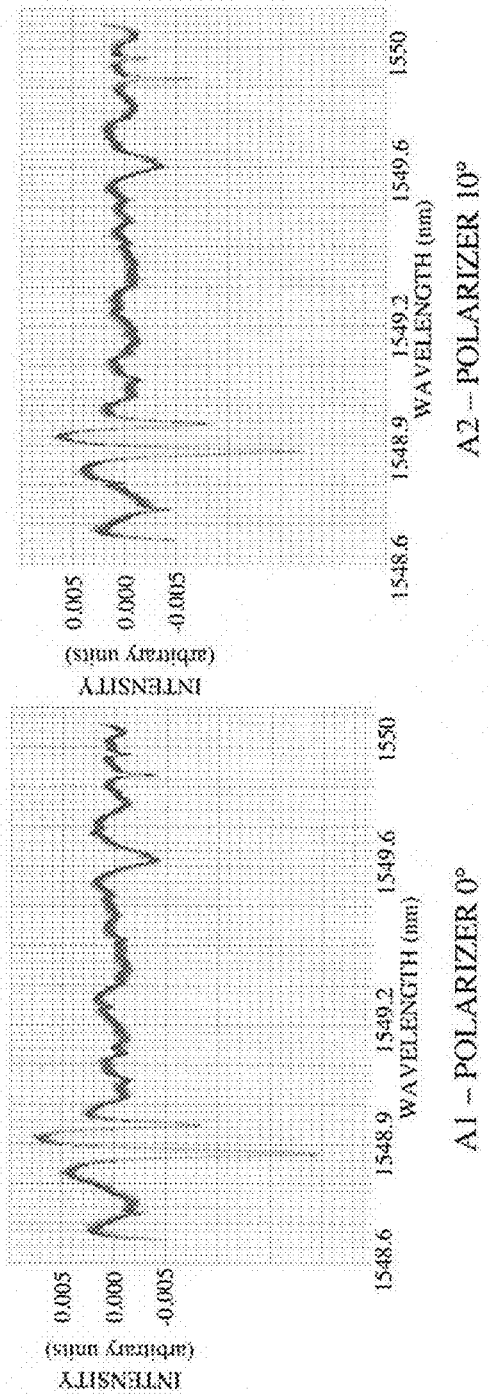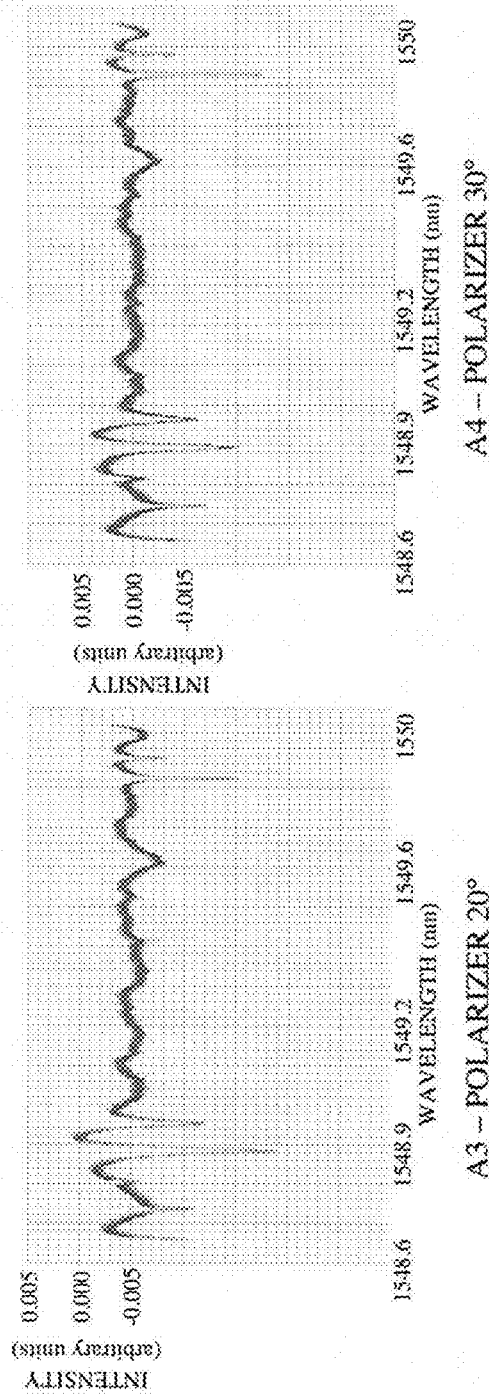
FIG. 17A

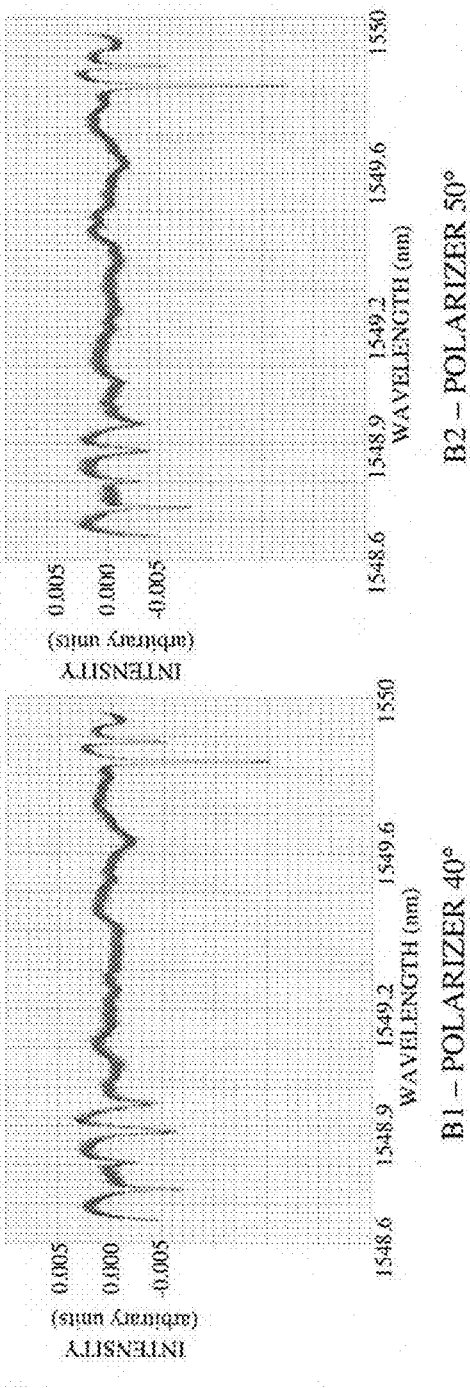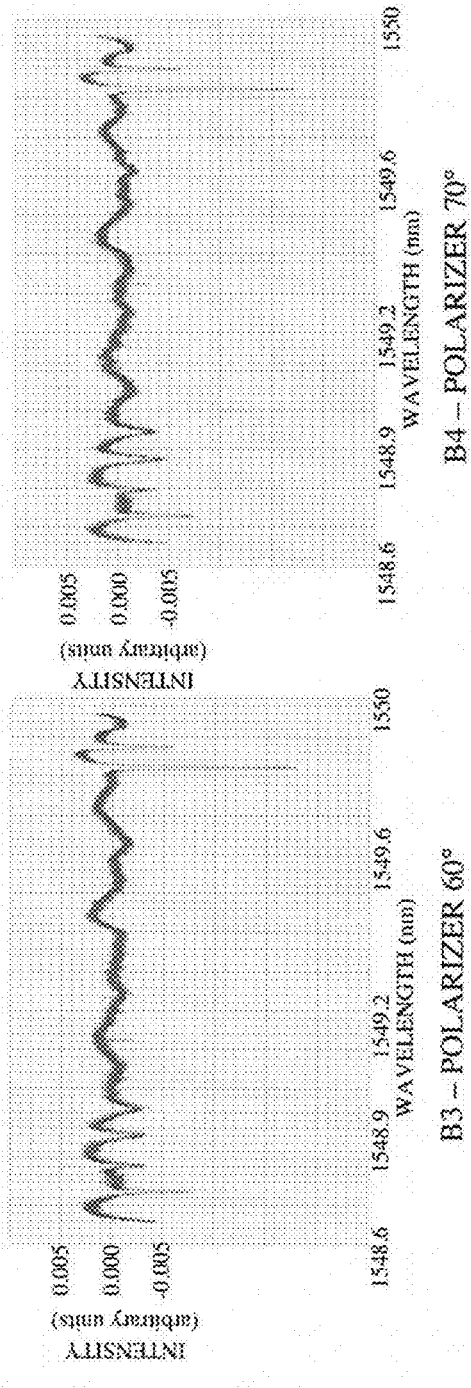
FIG. 17B

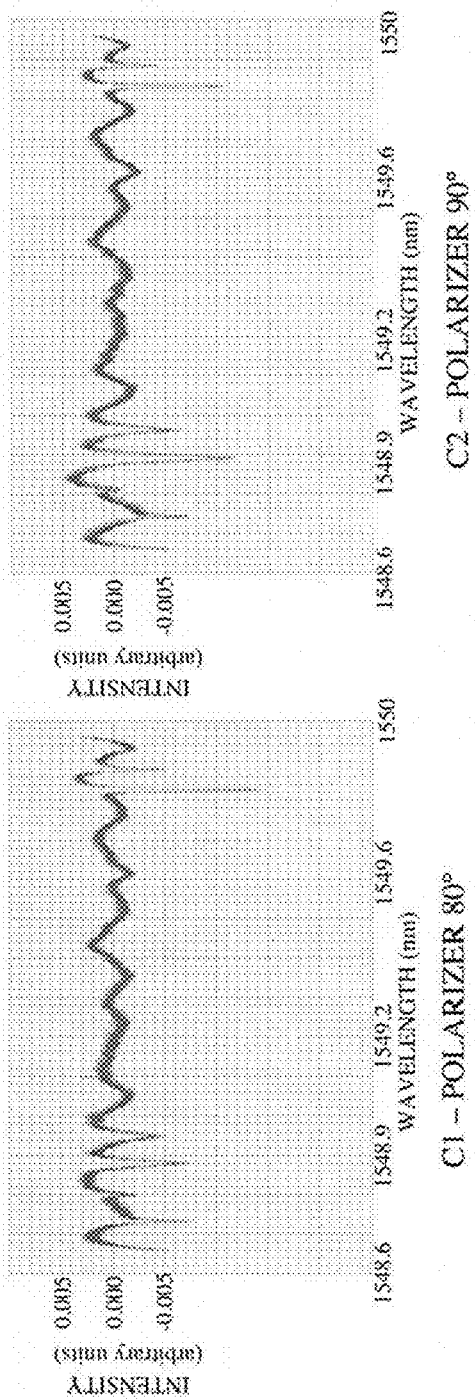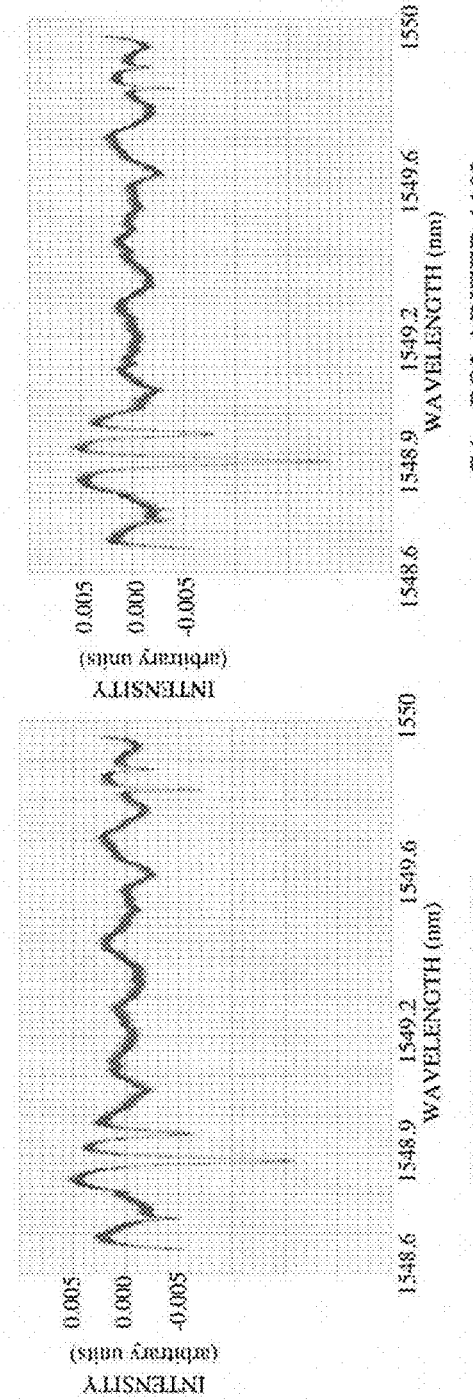
FIG. 17C

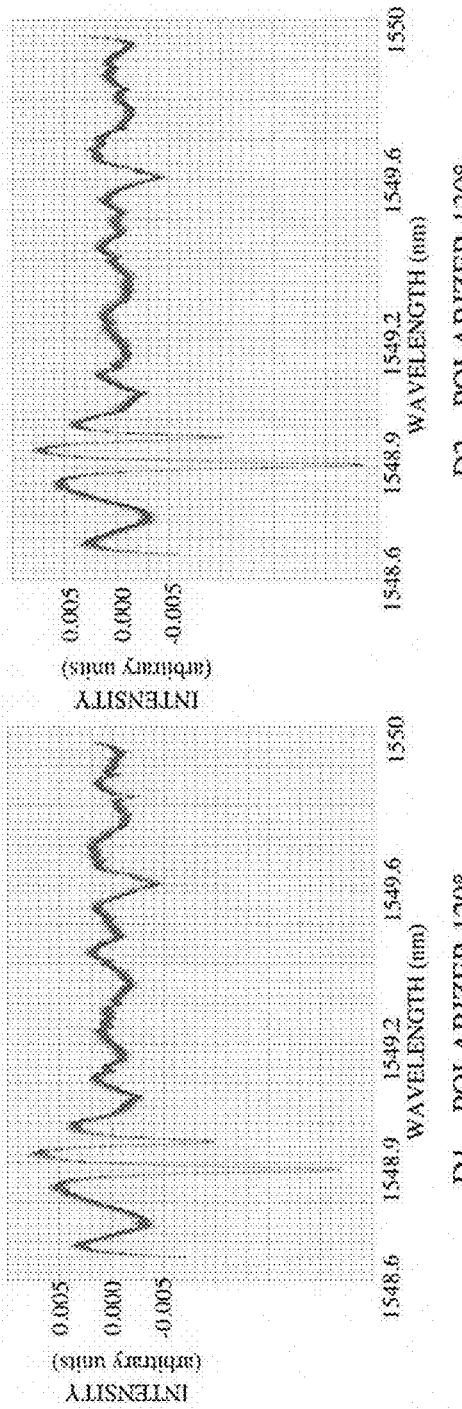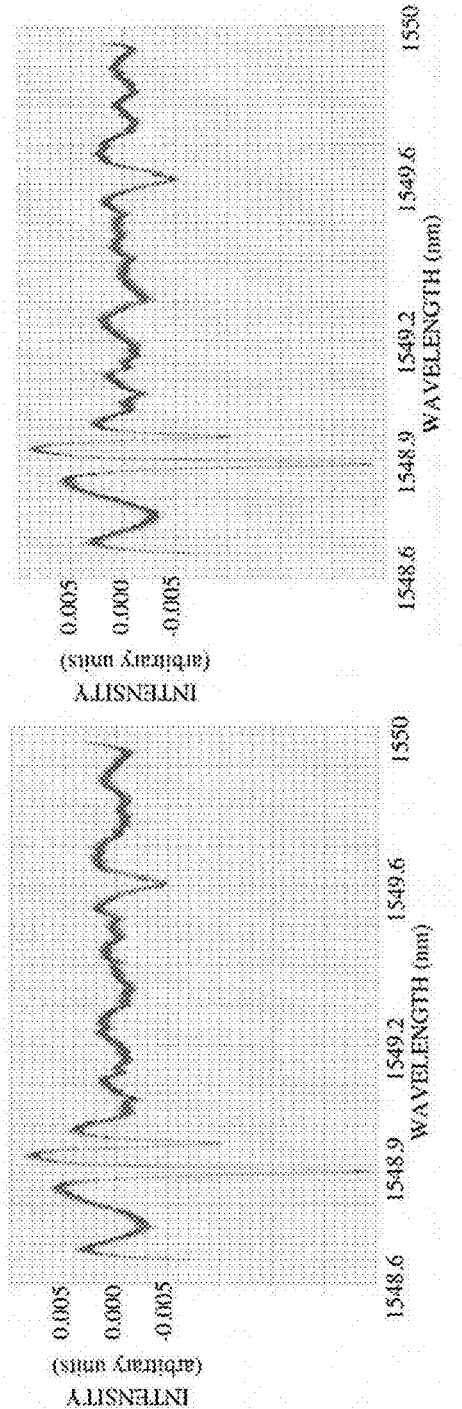
FIG. 17D

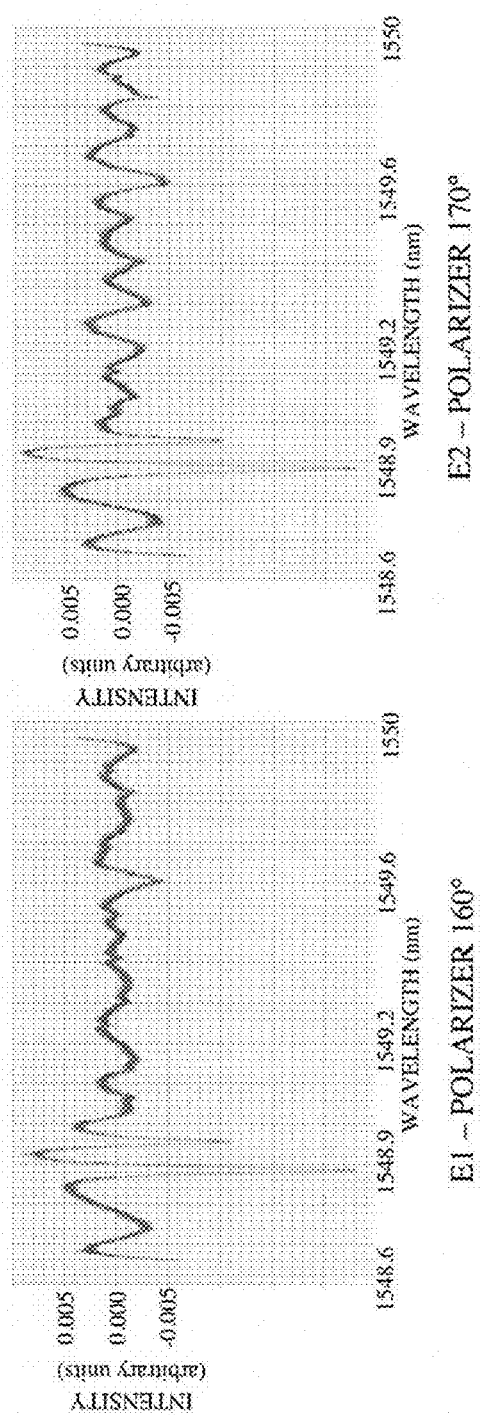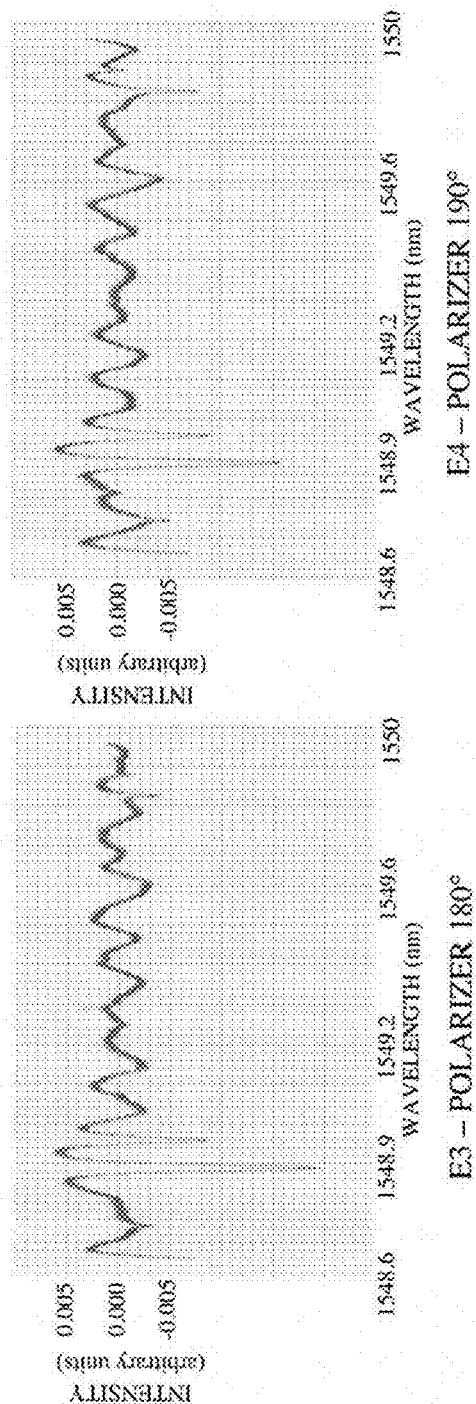
FIG. 17E

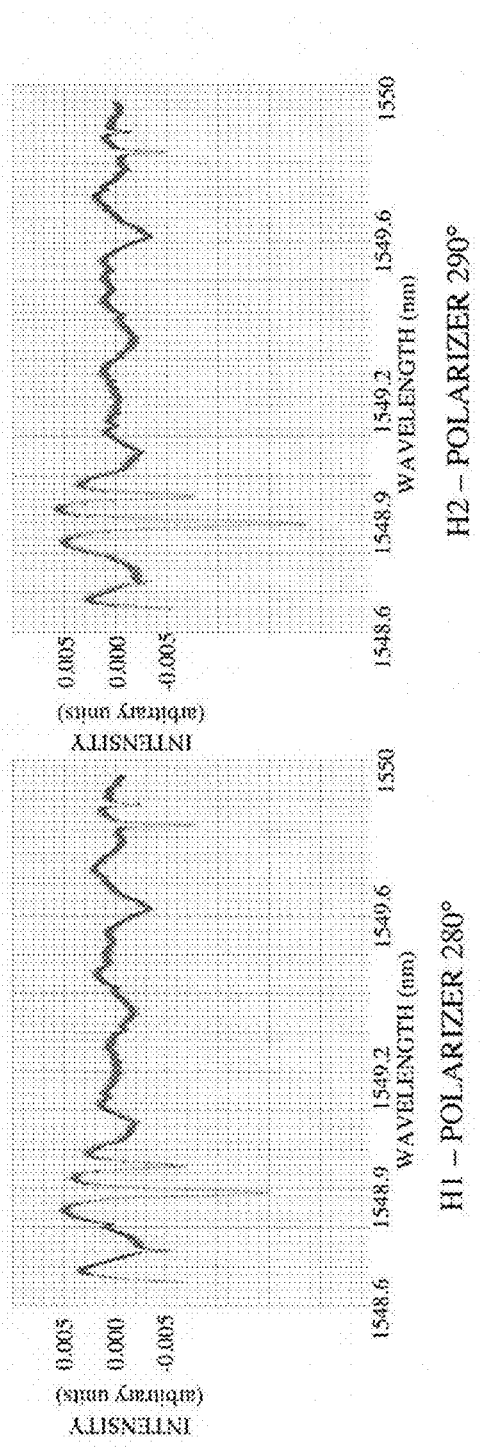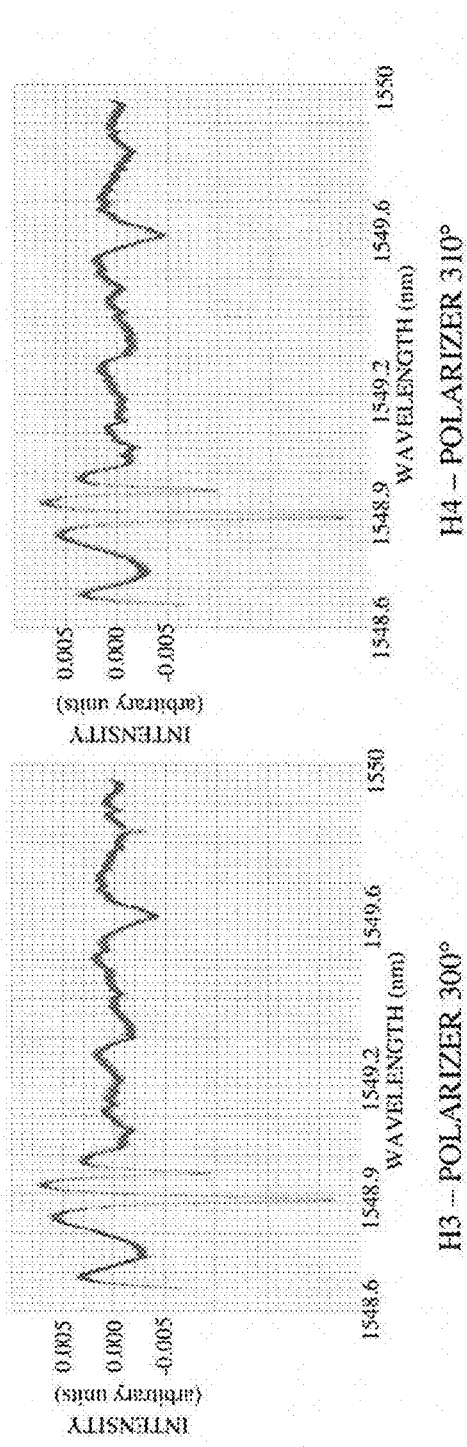
FIG. 17H

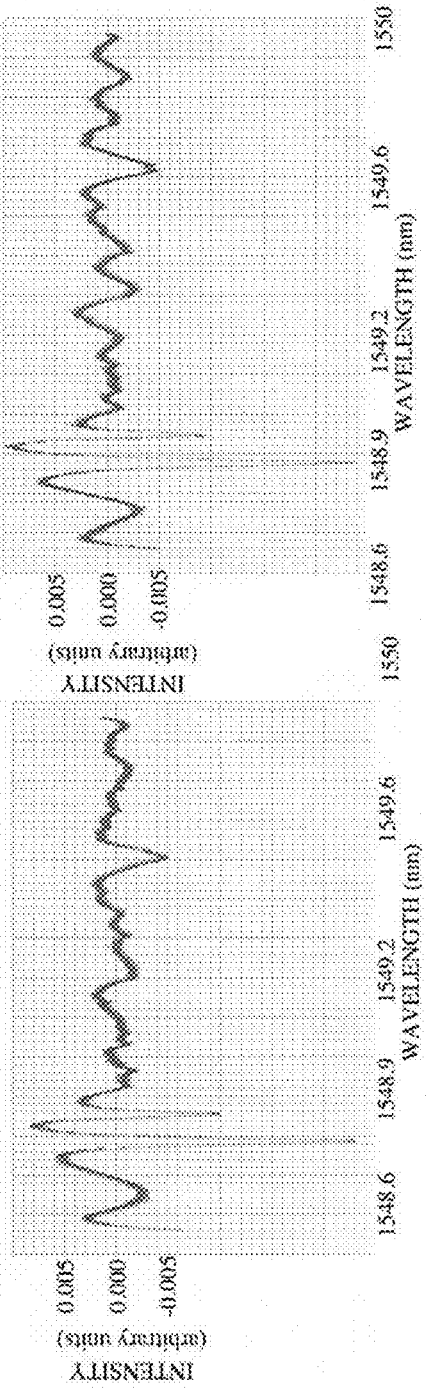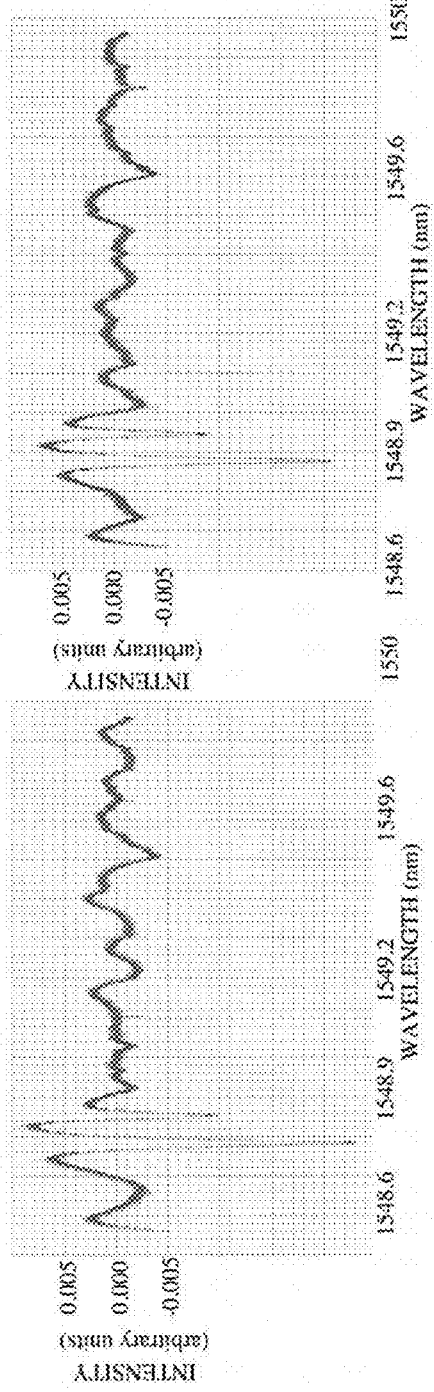
FIG. 17I

POLARIZATION DEPENDENT WHISPERING GALLERY MODES IN MICROSPHERES

CROSS-REFERENCE TO RELATED APPLICATIONS

This application claims the benefit of U.S. Provisional Patent application Ser. No. 61/488,348 entitled "POLARIZATION DEPENDENT WHISPERING GALLERY MODES IN MICROSPHERES" filed on May 20, 2011. The entirety of the above-noted application is incorporated by reference herein.

ORIGIN OF THE INVENTION

The invention described herein was made by an employee of the United States Government and may be manufactured and used only by or for the Government for Government purposes without the payment of any royalties thereon or therefore.

BACKGROUND

The field of electromagnetic wave propagation is a well-developed branch of physics and various physical models have been developed and supported by appropriate mathematical formulations, which includes the propagation of optical field in waveguides including optical fibers. With the advent of a phenomenon called morphology dependent resonances or whispering gallery modes in dielectric resonant cavities like spheres and cylinders, optical waveguides have been used to deliver the optical field to cavities. The resonances observed and reported have been, in most cases, explained only in terms of properties of the resonant cavities and the environment. Effects of the means of the light delivery, however, have never been discussed.

A dielectric microsphere (or similar geometry is an optical structure that exhibits resonant properties, which means that the microsphere can select very narrow segments of an incoming signal's spectrum for further manipulation and processing. As mentioned above, the optical resonances of a microsphere are frequently called the whispering gallery modes (WGMs). In general, microspheres belong to the same group of devices as Fabry-Perot interferometers and fiber Bragg gratings.

The optical resonances in microspheres are a function of their morphology (i.e., geometry and dielectric properties (refractive index)). Any perturbation to their morphology caused by a change in the surrounding environment will lead to a shift in the resonances (WGM). By tracking these morphology-dependent shifts of WGMs, it is possible to measure the change in a given environmental property. In comparison to Fabry-Perot interferometers and fiber Bragg gratings, morphology-dependent-resonance (MDR) microsphere sensors can be built in smaller sizes. The small size permits the use of these microspheres in a very dense fashion on a very small footprint, so compact multipurpose devices for sensing could be constructed.

In addition, microsphere tends to exhibit significantly higher quality factors Q, which is defined as $Q=\Delta/\lambda\Delta$, where $\Delta$ is the wavelength at which a resonance occurs and $\lambda\Delta$, is the line width of the resonant wavelength. The high Q-value offers the potential of a very high sensitivity of the measured quantity. Devices that employ high Q-value MDRs have been reported relating to applications in communications and biological sensors. In communication, MDR-based channel dropping filters and modulators have been demonstrated. Further, using the recent advances in microlithography, several MDR-based devices have been made on a common substrate permitting coupling signal at resonant modes from one resonator to another. In these applications, the resonator is perturbed externally to affect a change in its morphology.

In sensor applications, the MDR device is a passive element where the change in a specific environmental condition perturbs the morphology of the resonator, which is measured quantitatively by monitoring the resonance shifts. In the case of biological sensing, the optical resonance shifts occurs due to changes in the physical conditions of the surrounding medium alone (without inducing a perturbation to the morphology of the resonator itself). For example, a change in the refractive index of the surrounding medium alone will have an effect on the structure of sphere resonances and may be used to detect the presence of a certain chemical or a biological agent.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In one aspect, the innovation disclosed herein demonstrates and explains the effects of the properties of waveguides on the resonances in microspheres and discloses applications of MDRs to sensing parameters relevant to the control and health management of aerospace vehicles.

In another aspect of the innovation, a tunable resonant system is provided and includes a microsphere that receives an incident portion of a light beam generated via a light source, the light beam having a fundamental mode, a waveguide medium that transmits the light beam from the light source to the microsphere, and a polarizer disposed in a path of the waveguide between the light source and the microsphere. The incident portion of the light beam creates a fundamental resonance inside the microsphere. A change in the normalized frequency of the waveguide creates a secondary mode in the waveguide and the secondary mode creates a secondary resonance inside the microsphere.

In yet another aspect of the innovation, a portion of the waveguide is in contact with the microsphere, and wherein the portion of the waveguide in contact with the microsphere is thinned by etching or by heating and stretching that facilitates coupling between the waveguide and the microsphere.

In still yet another aspect of the innovation, a method of operating a tunable resonant system is provided and includes transmitting a light beam from a light source over a waveguide, the light beam having a fundamental propagation mode, receiving an incident portion of the transmitted light beam in a microsphere, creating a fundamental resonance inside the microsphere, changing a normalized frequency of the light beam, creating a secondary propagation mode in the waveguide, and creating a secondary resonance in the microsphere.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 15A-15I are graphical illustrations of resonances at a wavelength of approximately 1300 nm with the inclusion of a polarizer rotated in 10° increments in accordance with an aspect of the innovation.

FIGS. 17A-17I are graphical illustrations of resonances at a wavelength of approximately 1550 nm with the inclusion of a polarizer rotated in 10° increments in accordance with an aspect of the innovation.

DETAILED DESCRIPTION

Figure 1A:
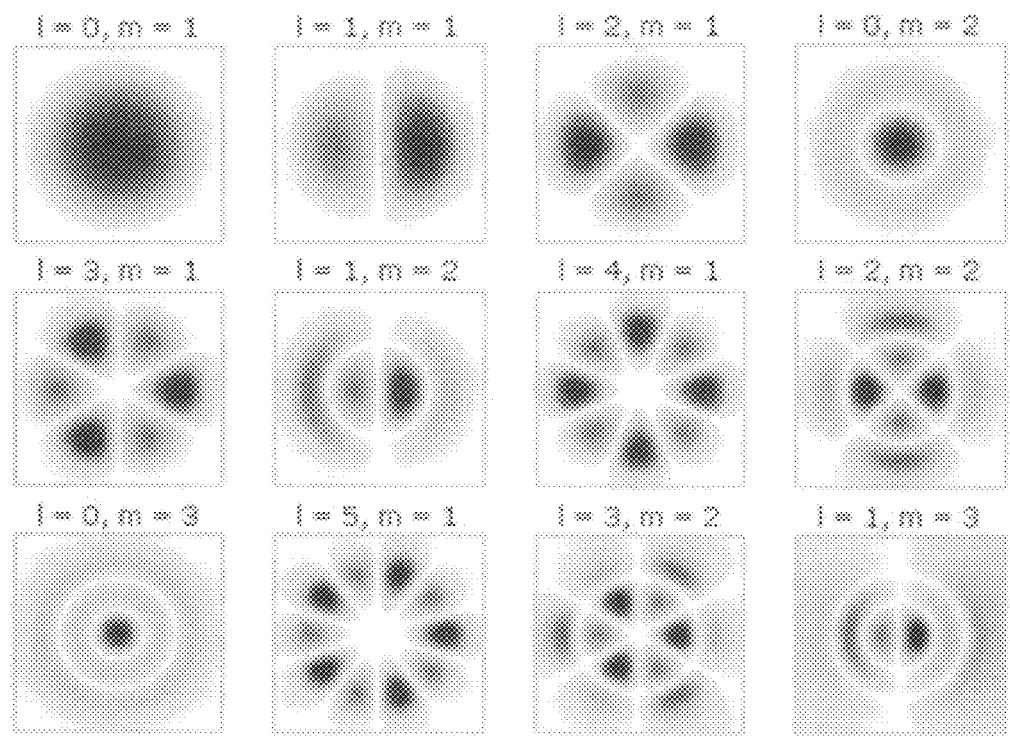
FIG. 1A is a graphic representation of electric field profiles for first guided modes $LP_{lm}$ of a fiber with a step refractive index profile in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

A resonant structure is a subsystem that under certain conditions, called matching or phase matching, produces significant amplification to the incident optical signal. Because optical signals belong to a family of electromagnetic signals the concept of resonances could be applied broadly to the entire electromagnetic spectrum. In the innovation disclosed herein, however a phenomena associated with the optical portion of the electromagnetic spectrum is disclosed. Some examples of optical resonant structures include Fabry-Perot interferometers, re-circulating loops, fiber Bragg gratings, and microspheres and other bodies of revolution.

Another subsystem represents a means used to deliver the optical power to the resonant structure or resonator. Examples of known techniques include free space illumination of microspheres by a plane wave or Gaussian beam, launching the light from the angle-polished tip of a fiber, side-way coupling using prisms, polished half-blocks, or etched side of a fiber, etc. Each technique uses light of a different structure including modes, polarization, intensity profiles, etc. Those differences in the properties of the incident light may cause different resonant conditions in the structures.

Means to generate, detect, and analyze the optical power are combined into another subsystem. This subsystem is introduced with an understanding that modulation of the incident light may in turn change the structure of light propagating by a given means towards the resonator. Thus, the response of the resonator may be changed just in reaction to the light modulation.

A system comprised of the three subsystems mentioned above should be connected together either by physical elements or by specific alignment or adjustment procedures. The innovation discloses resonant structures comprised of optical microspheres and other bodies of revolution and optical fibers with side-way coupling as means to deliver optical power to the resonant structure.

The innovation also discloses a total system approach and considers the effect of changes introduced in all individual subsystems on the formation of resonances in microspheres. To demonstrate the feasibility of such an approach, a modal structure of optical field propagating in a fiber is disclosed to illustrate how changes in that modal structure affect the resonances. The innovation employs polarization properties of the propagating modes to identify the effects of modes on the corresponding resonances.

Currently, work in the field of morphology dependent resonances (MDR) or whispering gallery modes (WGM) is done using microspheres as sensing elements reactive to environmental conditions: change in the conditions is followed by a change in resonances. The innovation discloses a broader scope and includes cases when, while the environmental conditions do not, the resonances change due to other factors external to the microsphere and environments that surround it. External factors may include the means where the incident optical beams (fields) are brought into contact with nearly spherical resonant cavities (microspheres) and various modulations applied to such optical beams (fields).

Propagation of electromagnetic fields inside dielectric cylindrical waveguides is described by solutions, expressed in terms of Bessel functions, of Maxwell equations in an appropriate coordinate system. Due to the discrete nature of the solutions, those fields are called propagating modes. The propagating fields extend beyond the cylindrical boundary of the waveguide into the outside region where they decay exponentially. In the outside region, most of the propagating fields are converted into radiation modes.

In the case of an optical fiber, a central portion of the dielectric waveguide called the core is surrounded by a layer of dielectric material with a refractive index $n_2$ slightly smaller than the refractive index of the core $n_1$. There are two reasons for that. First, such an arrangement permits, from a classical geometrical optics point of view, total internal reflection and maximum confinement of the propagating fields to the core of the fiber, while minimizing loses. The second reason comes from the practical aspects of having a constant cladding diameter and varying the core to obtain different number of propagating modes. A constant cladding diameter has enabled easy standardization of optical interconnects. Moreover, as the number of propagating modes decreases with the fiber core diameter, the presence of a relatively large diameter cladding has permitted easier handling of the fiber during manufacture, even as the core diameter is reduced significantly to support single mode operation.

Detailed analyses of light propagation in fibers reveal that in order for the propagating modes to exist a certain relationship should be maintained as:

$$n_2 k_0 < \beta < n_1 k_0 \tag{1}$$

which can be expressed as:

$$n_2 < \beta \frac{\lambda}{2\pi} < n_1 \tag{2}$$

Where $\beta$ is the propagation constant of the propagating or confined mode, $k_0 = 2\pi/\lambda$, and $\lambda$ is the free-space wavelength of light propagating in the waveguide.

It has also been shown that, from the formal solutions of Maxwell equations in cylindrical coordinates using matching boundary conditions on the core-cladding interface, two sets of solutions designated as the EH and HE modes could be extracted. Each of these two sets of modes by itself is a family of a sequence of modes defined by the parameter l. These sets, designated as $EH_{lm}$ and $HE_{lm}$ modes, are called hybrid modes, and have contributions from both $E_z$ and $H_z$ components. The relative contributions of $E_z$ and $H_z$ components to a transverse component of the field determines the designation of these hybrid modes.

In a special case where l=0, the field components of the modes are radially symmetric and the modes have non-vanishing fields components $H_r$, $H_z$, $E_\phi$ associated with TE for one set of modes and $E_r$, $E_z$, $H_\phi$ associated with the TM modes for the other set. These sets of modes are $TE_{0m}$ and $TM_{0m}$ modes respectively. $H_{11}$ does not have a cut off frequency and the mode propagates in a fiber with any diameter. It also means that the mode $HA_{11}$ propagates at any wavelength.

Each mode has its own propagation constant $\beta$, which is usually expressed as a function of a normalized frequency V:

$$V = a \frac{2\pi}{\lambda} \sqrt{n_1^2 - n_2^2} \tag{3}$$

where a is the fiber core radius. Furthermore, $\beta = nk_0$, where n the effective mode index or the ratio of the speed of light in vacuum to the mode phase velocity. The value of the normalized frequency determines the number of modes the optical fiber can propagate. If V<2.405 only one mode, $HA_{11}$ can propagate and the fiber is called a single-mode fiber.

The mathematical treatment of a mode propagating in a cylindrical fiber is significantly simplified with an introduction the weakly guiding modes approximation. The approximation is derived from a condition that:

$$\Delta = \frac{n_1 - n_2}{n_2} = \frac{\Delta n}{n_2} \ll 1 \tag{4}$$

It follows from the approximation that the longitudinal components of the propagating fields are small compare with the transverse ones. Furthermore the modes are considered to be linearly polarized in the transverse plane. Such modes are called linearly polarized and designated as $LP_{lm}$ modes. In the LP modes the transverse fields inside the core are presented as products of Bessel functions in the radial direction and trigonometric functions sines and cosines in the angular direction. The subscript l represents the lth-order Bessel function corresponding to the cut-off condition of the mode and m is the number of successive zeros in the Bessel function. In other words, the subscript l gives the number of angular nodes or azimuthal periodicity in the field distribution and the subscript m gives the number of radial nodes.

Figure 1B:
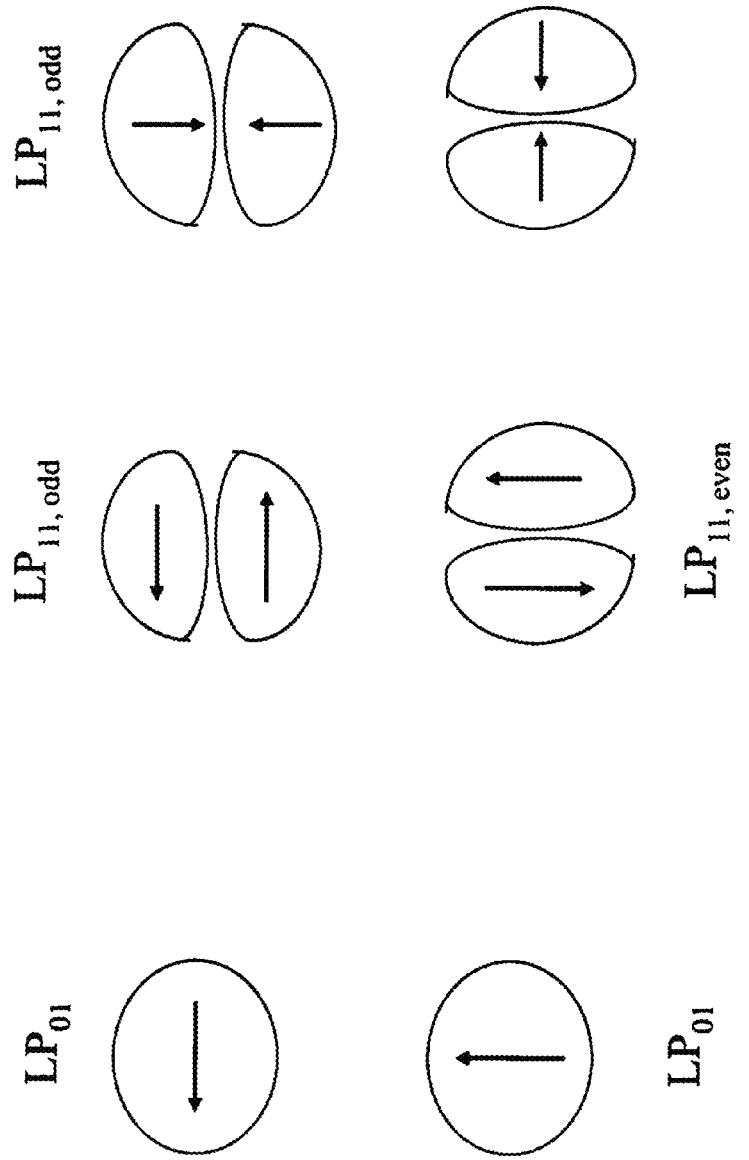
FIGS. 1B and 1C are a graphic representations illustrating intensity distribution profiles of the $LP_{01}$ mode in a single mode fiber with two different values of the normalized frequency V in accordance with an aspect of the innovation.

Referring to FIGS. 1A and 1B, each of the $LP_{lm}$ modes has also two mutually orthogonal components associated with E and H components of the electromagnetic field. Thus, modes with l=0 have two orthogonal states of polarization and "donut shaped" distributions of field intensities. The lowest order linearly polarized mode $LP_{01}$ includes the conventional lowest order mode $HA_{11}$. If v<2.405 then only one linearly polarized mode, $LP_{01}$ can propagate in the fiber. This mode is referred to as the fundamental mode.

The next linearly polarized mode, $LP_{11}$ is a combination of $HE_{21}$, $TM_{01}$, and $TE_{01}$ conventional modes. It can be constructed choosing $\sin(l\phi)$ or $\cos(l\phi)$ in the transverse angular distribution of the field intensity and two orthogonal states of polarization. As a result, the $LP_{11}$ mode has four possible distributions with π/2 symmetry in the circumferential (angular) φ direction. The $LP_{11}$ mode occurs when $2.405 \leq V < 3.832$. As the value of V increases even higher order modes become guided. Eventually a multimode fiber with a large number of modes propagating through it will be achieved.

Using the weakly guiding mode approximation, the normalized frequency V could be written as:

$$V \approx a \frac{2\sqrt{2}\pi}{\lambda} n_{eff} \sqrt{\Delta}$$

where $n_{eff}$ is the effective refractive index of the fiber, $n_{eff}$=n.

The normalized frequency V determines the number of guiding modes in a fiber. The parameter itself is a function of refractive indexes of the core and cladding, the core radius and the operating free-space optical wavelength. A change in any of them would lead to a change in the modal composition of light propagating in the fiber.

The value of normalized frequency V is determined by the fiber core radius, refractive indexes of core and cladding, and the operating wavelength. Changes in any of these parameters will lead to changes in the value of V. Those changes in the value of V keep the fiber in the single mode operation regime as long as the value of V does not exceed ~2.405.

Figure 1C:
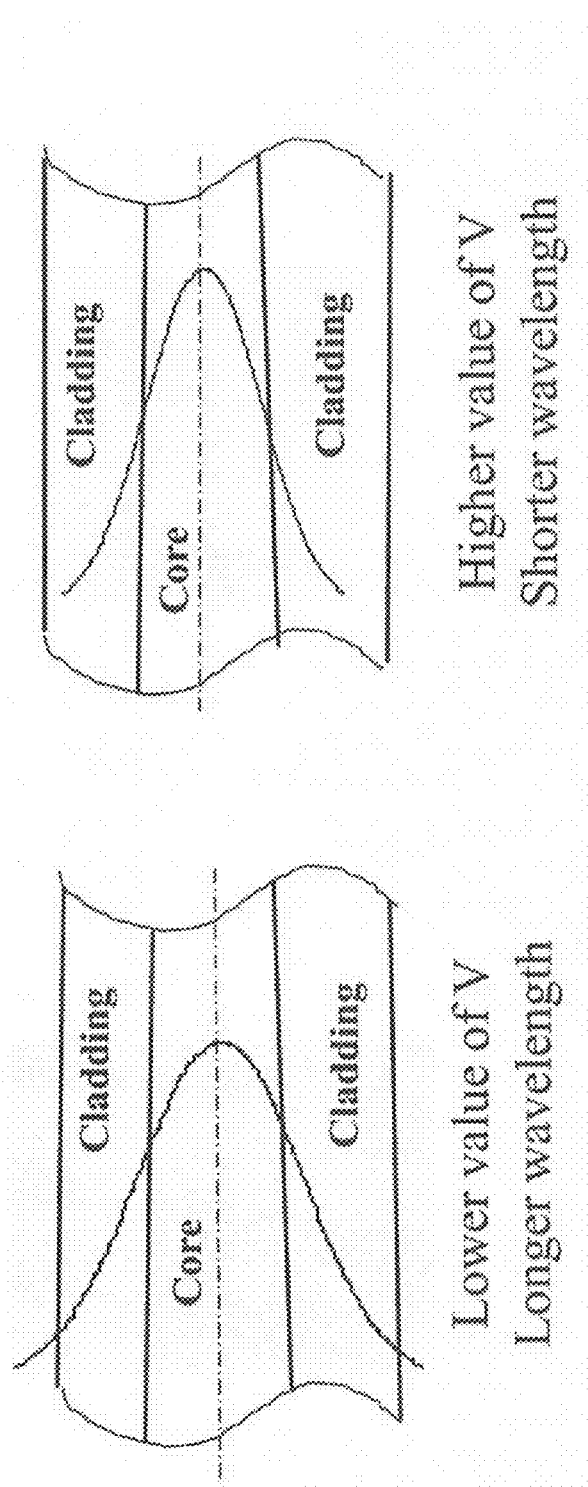

FIG. 1C illustrates intensity distribution profiles of the $LP_{01}$ mode in a single mode fiber with two different values of the normalized frequency V. The different values of V are achieved by using two different wavelengths. A longer wavelength results in a lower value of V and generates a broader intensity profile that extends deep into the cladding. On the other hand, a shorter wavelength results in a higher value of V and a more compact intensity profile for the fundamental $LP_{01}$ mode. Thus, in case of a shorter wavelength, less power is spilled into the cladding and more power is concentrated around the longitudinal axis of the fiber core.

As will become evident further below, the decrease of the wavelength continues the value of V becomes close to the cutoff value for the next, $LP_{11}$ mode, a eventually exceeds it. That mode will start appearing close to the core-cladding interface and will propagate towards the center of the fiber core with the continuing decrease of the operating wavelength.

The dynamic range for the wavelength scan may also be selected in such way that in the process of scanning the normalized frequency it passes through its cut-off values. For instance, it passes through the value V=2.405. Such configuration would produce a modal switching from a single mode to a two-mode operation.

Effects of variations in the constituent parameters on the normalized frequency V may be derived from the total differential dV, $$dV = \frac{\partial V}{\partial a} da + \frac{\partial V}{\partial \lambda} d\lambda + \frac{\partial V}{\partial n} dn + \frac{\partial V}{\partial \Delta} d\Delta \quad (6)$$

which may be also written in general using the sensitivity functions as:

$$dV = A[S_a da + S_\lambda dA + S_n dn + S_\Delta d\Delta] \quad (7)$$

where coefficient $A = 2\sqrt{2}\pi \approx 8.8857$.

The sensitivity functions $S_a$, $S_\lambda$, $S_n$, and $S_\Delta$ respectively are:

$$S_a = \frac{n\sqrt{\Delta}}{\lambda}, \; S_\lambda = -\frac{an\sqrt{\Delta}}{\lambda^2}, \quad (8)-(11)$$

$$S_n = \frac{a\sqrt{\Delta}}{\lambda}, \text{ and } S_\Delta = \frac{an}{2\lambda\sqrt{\Delta}}$$

Any of the above mentioned constituent parameters individually and/or in combination affects the value of the normalized frequency V. For simplicity and purposes of illustration, however, the wavelength of the light beam will be altered to show the effects of change on the normalized frequency V and the resultant modes.

If the radius of the core is constant and variations in refractive indexes are insignificant, than the normalized frequency V depends only on the wavelength, $$dV = -A \frac{an\sqrt{\Delta}}{\lambda^2} d\lambda \text{ and } \frac{dV}{d\lambda} = -A \frac{an\sqrt{\Delta}}{\lambda^2} \quad (12)$$

Whispering gallery modes (WGM), also known as morphology dependent resonances (MDR), occur in resonant cavities with shapes formed by bodies of revolution such as spheres, cylinders, ellipsoids, etc. Resonant cavities discriminate certain wavelengths by selectively isolating them. Geometry and dimensions of the cavity, material properties, and the environmental conditions are the main factors in choosing the wavelengths.

The most commonly used resonant cavities are microspheres. Other types, however, have also been introduced. Due to the dependency of the resonances on geometric and material properties of microspheres as well as the environment, the microspheres have been proposed as sensing structures for various applications including medical, chemical, and aerospace.

MDR (or WGM) of spheres have been the subject of a number of theoretical studies and techniques used to describe the phenomenon could be loosely grouped into three broad categories. The first group of analytical techniques uses Maxwell's equations and propagates the incident fields through a medium that includes resonating objects or cavities. Within a homogeneous sphere the electromagnetic field is expressed in terms of its components in spherical coordinates. The analytical techniques derived from solving Maxwell's equations could be somewhat cumbersome. They, however, permit the introduction of polarized electromagnetic fields.

The second group contains methods and techniques of quantum mechanics, such as the potential well principle among others. These methods use quantum-mechanical analogy between the scalar Helmholtz equation that results from solving the Maxwell equations in spherical coordinates and the Schrödinger equation. A Schrödinger-like equation and analogy with the hydrogen atom have brought a concept of the photonic atom model. The photonic atom model also helps to analyze the quantization process. Techniques based on the potential well theory are useful as they may provide a clearer understanding of the effects of constituent parameters of the resonators and the incident field.

The last group includes a geometric optics approach with some modification. The geometric optic approach is attractive due to its simplicity. It also affords a straightforward explanation of the physical phenomenon.

In more simple terms, when a sphere is placed in an electromagnetic field, the distribution of intensities of the field components inside it follows solutions of the scalar Helmholtz equation in spherical coordinates. These intensity distributions are also called eigenfunctions or modes. Due to the fact that geometry and material properties of the sphere are included in the equations resulting from solutions of the Helmholtz equation it is natural that these parameters, because they depend on the sphere alone, would affect the distribution of the intensities inside the sphere. Moreover, the sphere acts as a resonator by responding more strongly to some electromagnetic fields than to others. This phenomenon explains how part of the energy from the incident electromagnetic field is being stored in resonant modes inside the sphere. A conclusion that could be drawn is that the strength of resonances depends not only on geometry and material properties of spheres but on the spectrum of the incident electromagnetic field.

In the optical range of the electromagnetic spectrum, the trapping of energy inside optical microspheres can be explained in terms of total internal reflections. The coupled portion of the light that enters the sphere stays inside it, provided that the refractive index of the sphere is larger than that of its surrounding medium. The total internal reflection coupled with the matching conditions results in a resonance of certain wavelengths of the incident light inside the sphere. The trapped wavelengths and their strength are theoretically determined by the solutions of Maxwell's equations in the spherical coordinates inside the sphere and are expressed in terms of their radial and angular components or modes. Thus, solutions of the scalar Helmholtz equation in spherical coordinates come in a form of so called eigenfunctions for the radial, azimuthal, and polar coordinates. These radial, azimuthal, and polar eigenfunctions are associated with the radial (n), polar (l), and azimuthal (m) mode numbers. The radial modal number n gives the number of nodes of the intensity distribution in radial direction. The polar mode number l is approximately the number of wavelengths packed along the circumference of the resonator traveling along the equatorial belt of the sphere. For any value of l, m varies as $|m| \leq l$. In a perfect sphere with uniform index of refraction, all m modes have the same resonant wavelength as the l modes as m=l. Furthermore, sets l and m are associated with angular positions $\theta$ and $\phi$. The angles are measured in two orthogonal planes passing through the center of the sphere. For a given radius r, spherical components with the same values of angles $\theta$ and $\phi$ have identical values. This is called degeneracy in the solution of Maxwell's equations in spherical coordinates.

In practical applications of MDRs, the optical resonances are excited by coupling light into the sphere from a tunable laser at grazing angles. Several methods can be used to launch the light into the sphere in such a fashion. For example, a common approach in sensor applications is the side-coupling of the laser light using a single mode optical fiber. The optical fiber serves as an input-output conduit. As the laser is frequency tuned across a range, the optical resonances of the sphere are observed as sharp dips in the transmission spectrum through the fiber.

Figure 2A:
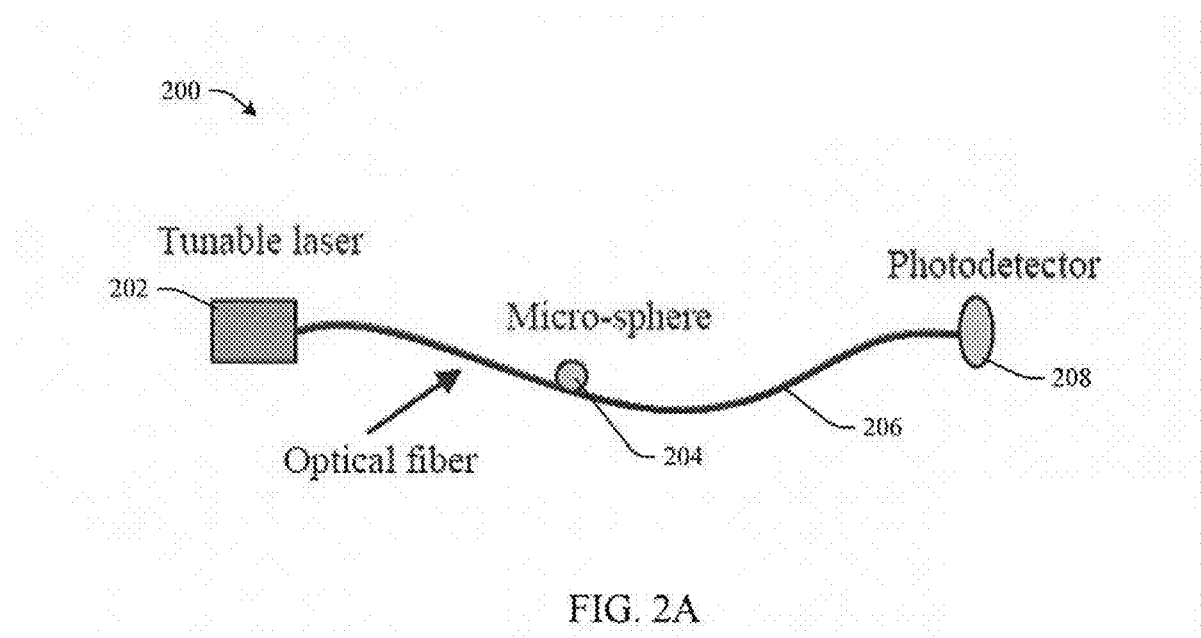
FIG. 2A is a schematic illustration to generate optical resonances in a microsphere with a side-coupled optical fiber in accordance with aspects of the innovation.

For example, FIG. 2A is an illustration of a basic apparatus to generate whispering gallery modes in microspheres. Specifically, FIG. 2A is an example schematic of an apparatus 200 to generate optical resonances in a microsphere by side-coupled optical fiber. The apparatus includes a light source 202, such as but not limited to, a tunable laser diode, a microsphere 204 mounted on a stem for easy handling and manipulation, a waveguide 206, such as but not limited to an optical fiber, to deliver light from the source 202 to the microsphere 204, and a photodetector 208.

The tunable laser 202 emits light whose wavelength varies in time. This is achieved by sending a monotonically changing current through the laser diode junction. In response, the wavelength changes accordingly. The light generated by the laser 202 is coupled in the waveguide 206. The microsphere 204 is placed close to the optical fiber 206 in such manner that light at certain wavelengths is coupled into the microsphere 204. The photodetector 208 detects the light and, in case of absence of the microsphere 204, displays a continuing spectrum across all wavelength emitted by the laser 204 over the given period of time. However, the microsphere 204 extracts certain wavelengths, and signals at these wavelengths are not being carried toward the photodetector 208.

To obtain a stable operation of the laser 202, the process of changing current through a laser junction is accompanied by keeping the junction temperature constant. However, the resultant dynamic range does not exceed 0.6 nm. This range has been often found insufficient to observe the resonances. To increase dynamic range the process of changing current is combined with changing the constant temperature ranges.

Figure 2B:
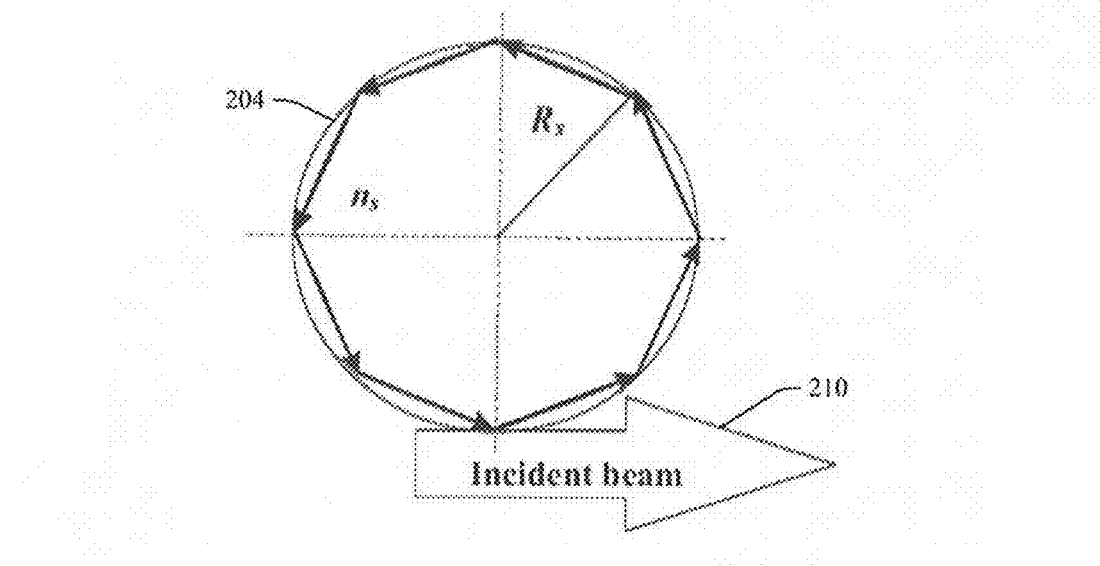
FIG. 2B is a close-up schematic view of the microsphere showing a light beam from a laser incident to the microsphere in accordance with an aspect of the innovation.

FIG. 2B is a close-up view of the microsphere 204 showing a light beam 210 from the laser 202 incident to the microsphere 204. FIG. 2B demonstrates multiple reflections inside the microsphere 204, which has a radius $R_s$ and a refractive index $n_s$, once the light beam 210 is coupled into the microsphere 204. For $R_s \gg \Delta$, where $\lambda$ is the wavelength of light, the approximate resonance conditions within the microsphere 204 and the spacing $\Delta\lambda_l$ between two consequent modes l, are, respectively:

$$2\pi n_s R_s = l\lambda \tag{13}$$

and $$\Delta\lambda_l/\lambda \approx \lambda/2\pi n_s R_s \tag{14}$$

Thus, a glass microsphere with a 200 μm radius should generate, at the wavelength $\lambda$=1300 nm, resonances with a periodicity that satisfies $\Delta\lambda l/\lambda \approx 10^{-3}$, and as a result will have a free spectral range of $\Delta\lambda_{FSR} \approx 1.3$ nm.

Figure 3:
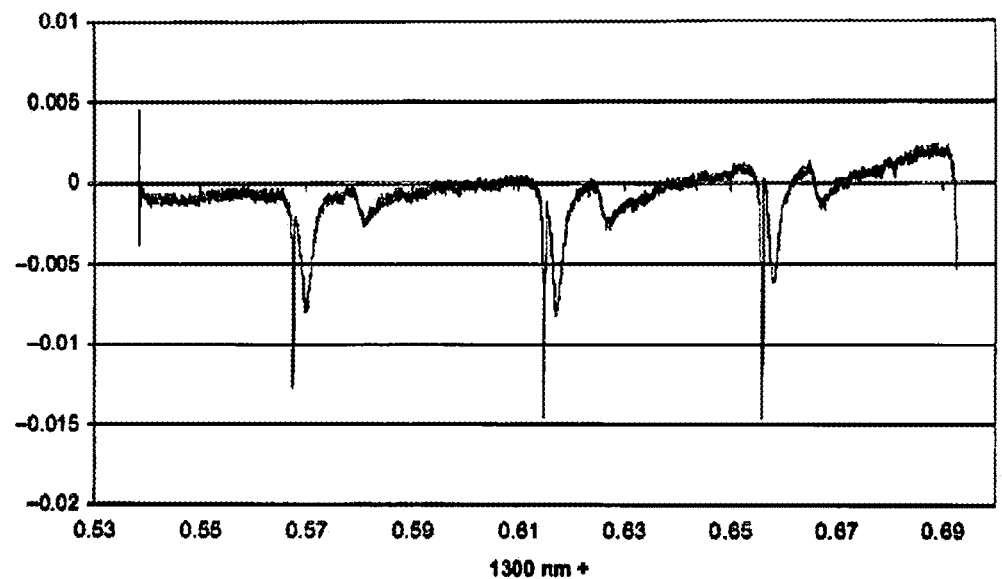
FIG. 3 is a graph illustrating resonances in a microsphere in accordance with an aspect of the innovation.

Referring to FIG. 3, experimentally observed resonances, however, are more densely packed where they are observed as sharp dips. In this case, the light beam 210 from the laser 202 is side coupled into the ~200 μm radius glass sphere via the single mode optical fiber 206 and the transmission spectrum through the fiber 206 is observed. Others have demonstrated that a presence of aqueous environments led to shifts of resonances in dielectric microspheres.

Figure 4:
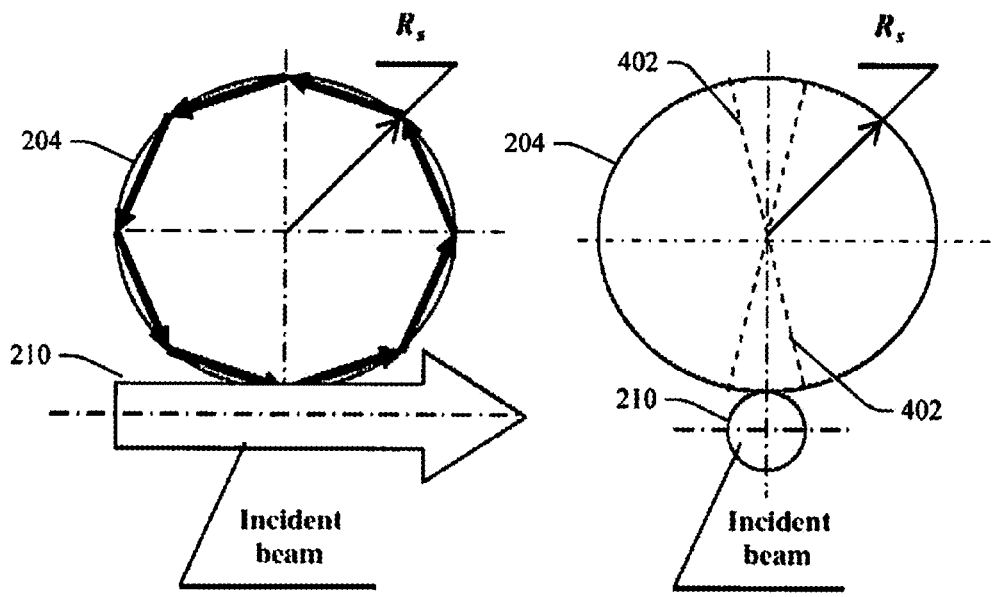
FIG. 4 is a schematic illustrating the formation of dense resonances in an imperfect microsphere in accordance with an aspect of the innovation.

The occurrence of closely located resonances is due to several factors, including the fact that the incident beam has a certain cross section and, as shown in FIG. 4, also excites resonances (or modes) in azimuth planes 402 tilted with respect to the polar plane. The dashed lines show maximum inclinations of the azimuth planes 402. The spheres used in experiments are, however, imperfect and their radii and homogeneity of the refractive indexes are not uniform. Therefore, portions of the incident beam 210 coupled under an angle see different propagating conditions than the one coupled along the main azimuth plane. The imperfections in the spheres lead to removal of degeneracy and formation of multiple intermediate resonances. The order of resonances in FIG. 4 could be identified, according to convention, by their quantum numbers (n, l, m−1), (n, l, m), and (n, l, m+1).

Figure 5:
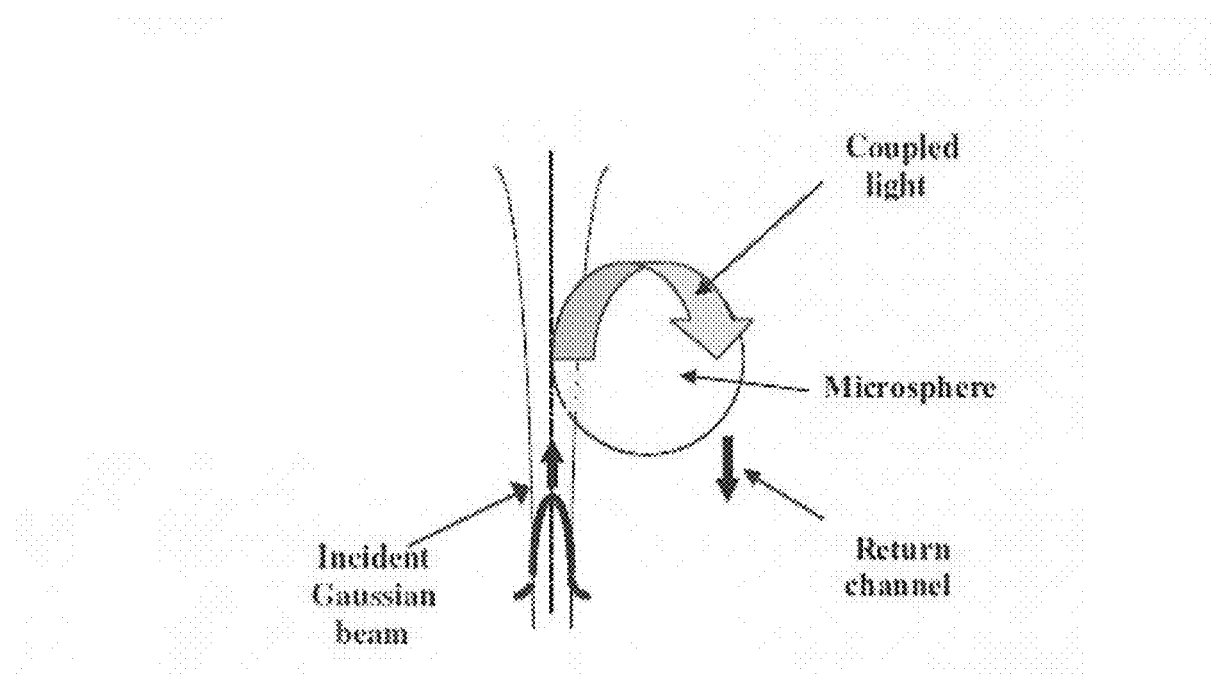
FIG. 5 is a schematic illustration of a Gaussian beam coupled into a microsphere in accordance with an aspect of the innovation.

A Gaussian laser beam striking a sphere at a grazing incidence demonstrates the formation of MDRs in the sphere as well as an escape or return channel for the light leaving the sphere. FIG. 5 schematically illustrates the formation of the return channel that could be used to extract resonances in the form of intensity peaks in the spectral domain rather than intensity dips, as shown in FIG. 3.

Figure 6:
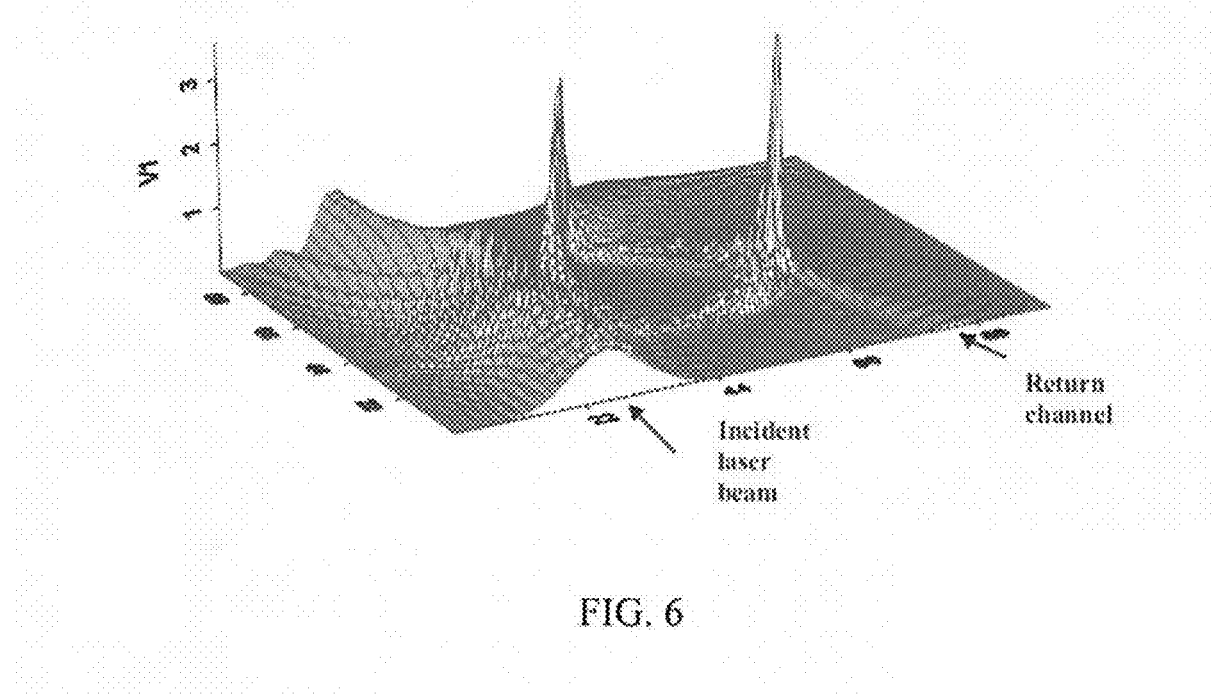
FIG. 6 is a graphical demonstration of morphology dependent resonances in accordance with an aspect of the innovation.

Results of numerical calculations of light coupling into a microsphere are shown in FIG. 6. The model used is derived from Maxwell's equations with the Yee algorithm being chosen to simplify computational matching boundary conditions. Computations are done by the finite-difference time-domain (FD-TD) numerical method. FIG. 6 shows distinct points of ingress and egress of the light into and from the sphere as well as the formation of a return channel.

MDRs in a microsphere can be induced by an external electromagnetic field. At optical frequencies, an incident laser beam either is brought into a close contact with the microsphere surface or strikes the microsphere at a distance. In both cases resonances have been observed, reported, and used to study properties of microspheres and small droplets. As mentioned above, a commonly used approach for sensor applications is that shown schematically in FIG. 2A, where the incident beam 210 is brought to the surface of the microsphere 204 by way of an optical fiber 206.

Figure 7:
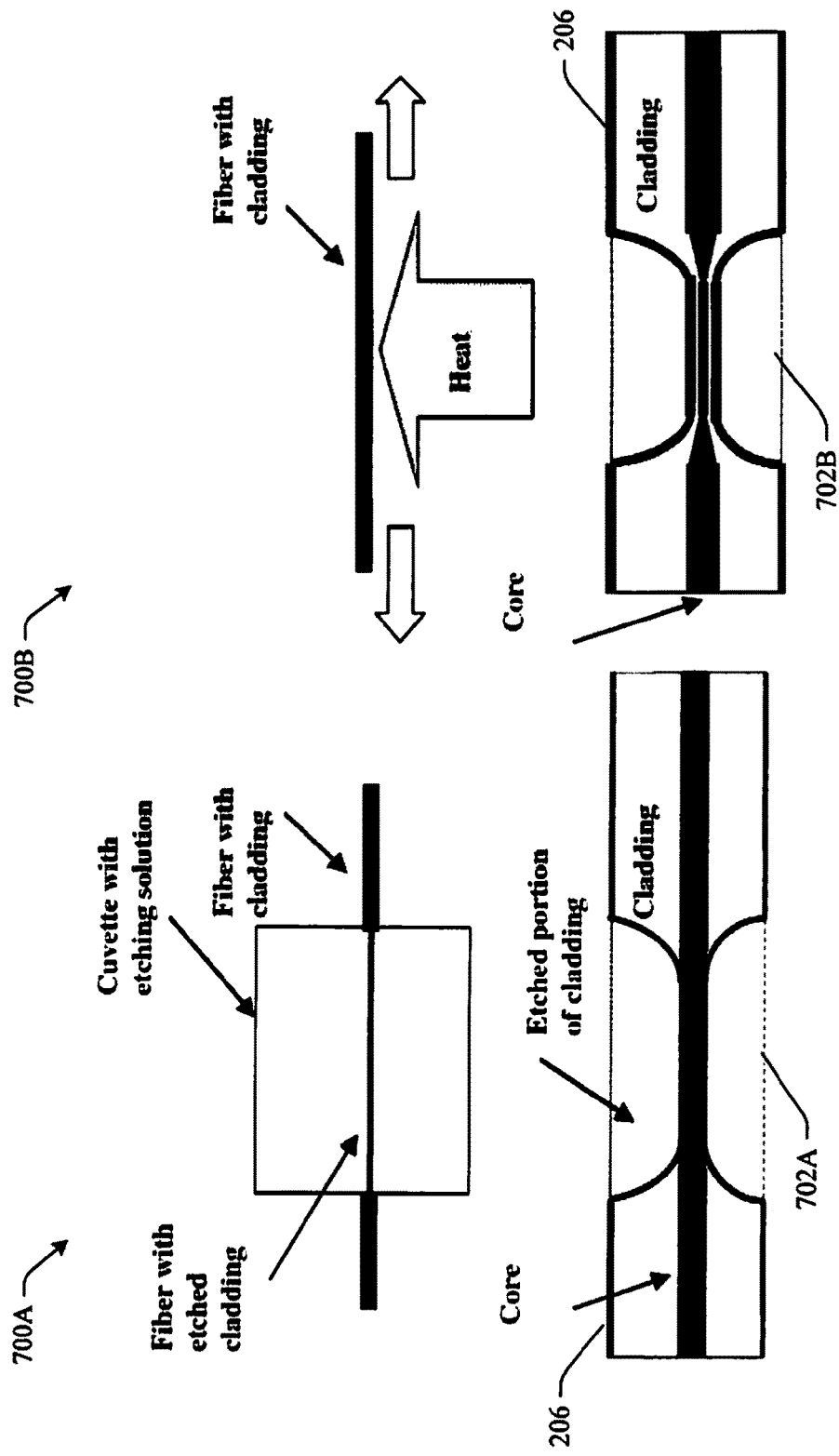
FIGS. 7A and 7B are schematic illustrations of two methods of thinning an optical fiber in accordance with an aspect of the innovation.

To facilitate the optical coupling between the microsphere 204 and the fiber 206, the innovation disclosed herein provides that the section of fiber 206 that is in contact with the microsphere 204 is tapered by either etching (etched fiber 700A), as shown in FIG. 7A or by heating and stretching (heated fiber 700B) the fiber 206, as shown in FIG. 7B. It is to be appreciated that any known method can be used to taper or thin the relevant portion of the fiber. In each case, a section 702A, 702B of optical fiber 206 is thinned out to extend its evanescent field beyond the fiber boundaries. The thinned section 702A, 702B of the fiber 206 has a diameter comparable with the fiber core. A small diameter of the thinned section 702A, 702B permits positioning of a microsphere 204 very close to the core of the fiber 206 and provides a better coupling of light into the microsphere 204. The etched fiber 700A tends to produce cleaner coupling because the core of a single mode fiber supports only one fundamental mode which has its evanescent field extending far beyond the core boundaries. The heated and stretched 700B portion of a single mode fiber, on the other hand, despite its small diameter, has a cross section which consists of remnants of both core and cladding. The evanescent field, thus, is different from the etched fiber 700A. The locations of resultant resonances in the spectral domain are also expected to be different.

Thus, when a portion of the cladding is removed to couple light propagating in the fiber into the microsphere, the type of coupled mode will depend on the operating wavelength. Thus, under certain values of wavelength the second order $LP_{11}$ mode being coupled from the fiber into the microsphere is observed despite the fact the fiber itself is operating in the single mode regime.

Figure 8:
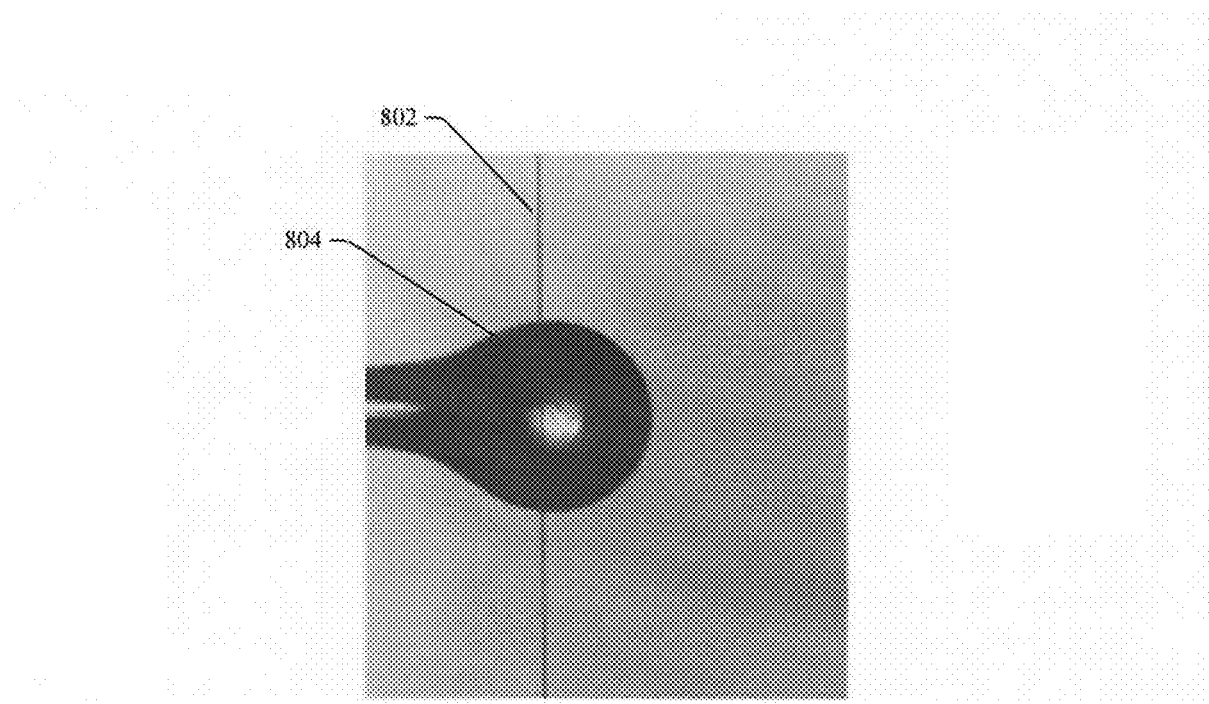
FIG. 8 is a close-up view of an example microsphere in close proximity to an etched fiber in accordance with an aspect of the innovation.
Figure 9A:
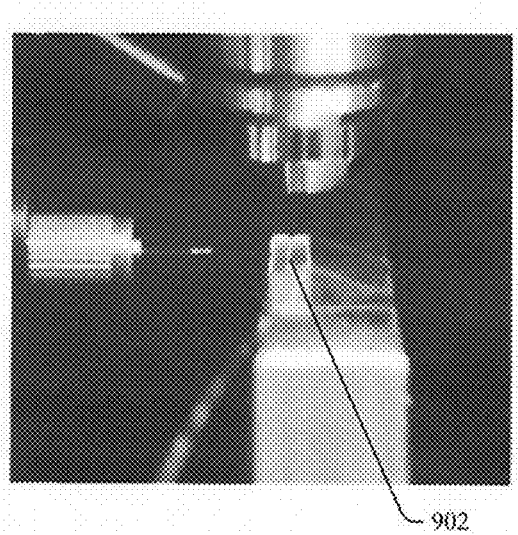
FIGS. 9A and 9B are example illustrations showing a microsphere on a fiber stem positioned on a half-block coupler and a microscope image of the microsphere on the top of a single mode fiber in accordance with an aspect of the innovation.
Figure 9B:
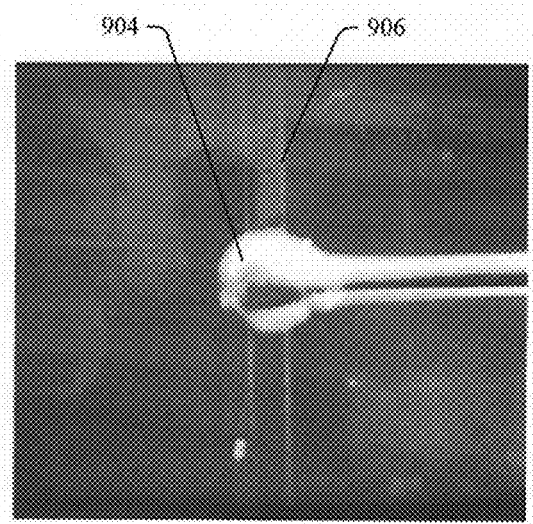

FIG. 8 is an illustration of an etched fiber 802 placed in a close proximity to a microsphere 804. A typical way of manufacturing microspheres involves melting the tip of a fiber until it forms a spheroid. The process results in a microsphere on the tip of a fiber stem and permits an easy manipulation and positioning of the microsphere. Steady and repeatable resonances have been obtained by placing microspheres on half-block couplers, as shown in FIGS. 9A and 9B. A half-block coupler is an optical structure in which a piece of bent fiber is embedded in a glass block in such a way that a portion of the side of the fiber is exposed. That portion of the exposed fiber is polished to bring the core closer to the surface. The structure provides a stable positioning of the microsphere on the top of the polished section of the fiber. Specifically, FIG. 9A is an illustration showing a microsphere on a fiber stem positioned on a half-block coupler 902 and FIG. 9B is a microscope image of the microsphere 904 on the top of a 125 µm single mode fiber 906.

The conventional way of manufacturing microspheres by melting the tip of a fiber has a serious drawback. The technique cannot produce identical microspheres in a repeatable fashion. As a result, the MDR spectra from spheres manufactured by a seemingly identical method will not just have multiple intermediate resonances, but those resonances will vary from one microsphere to another. As the quality of microspheres improves an issue of the observable range of wavelengths comes into play. The range of wavelengths over which the resonances in microspheres are observed is determined by the tunability of laser diodes used for these purposes. Typically, that range does not exceed 0.5 nm and is not sufficient to observe resonances associated with multiples of consecutive l modes.

To extend the laser diodes' operability range they are driven by a continuously changing current but at different temperatures. The operating range of a tunable laser diode may be extended by changing the operating temperature of the diode junction. Thus, tuning the laser continuously over fixed temperature intervals produces a broader range of operation. Such an approach, however, requires an accurate calibration to assure the continuity of the laser performance at different temperatures and different current.

Figure 10:
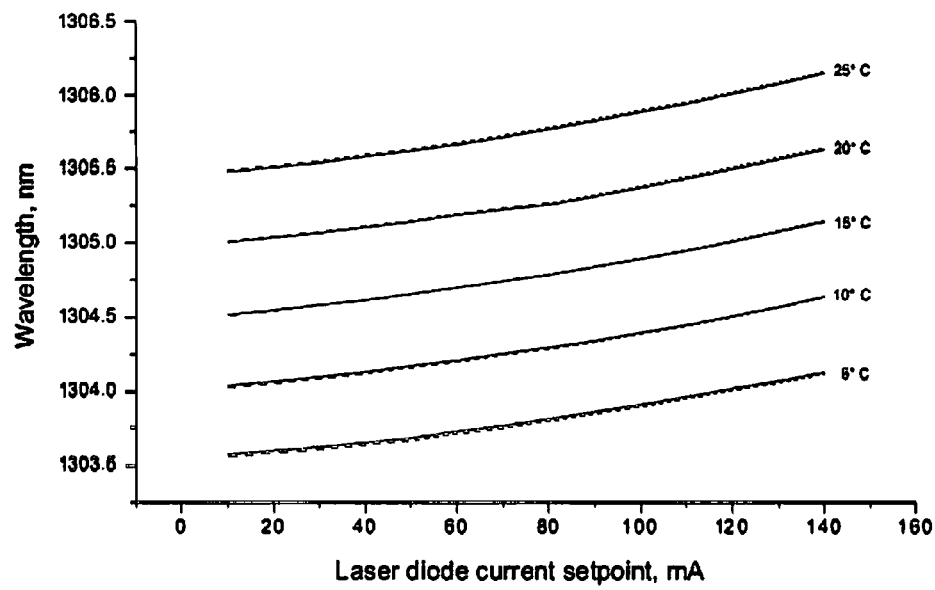
FIG. 10 is a graph of laser diode calibration curves at different temperatures in accordance with an aspect of the innovation.
Figure 11:
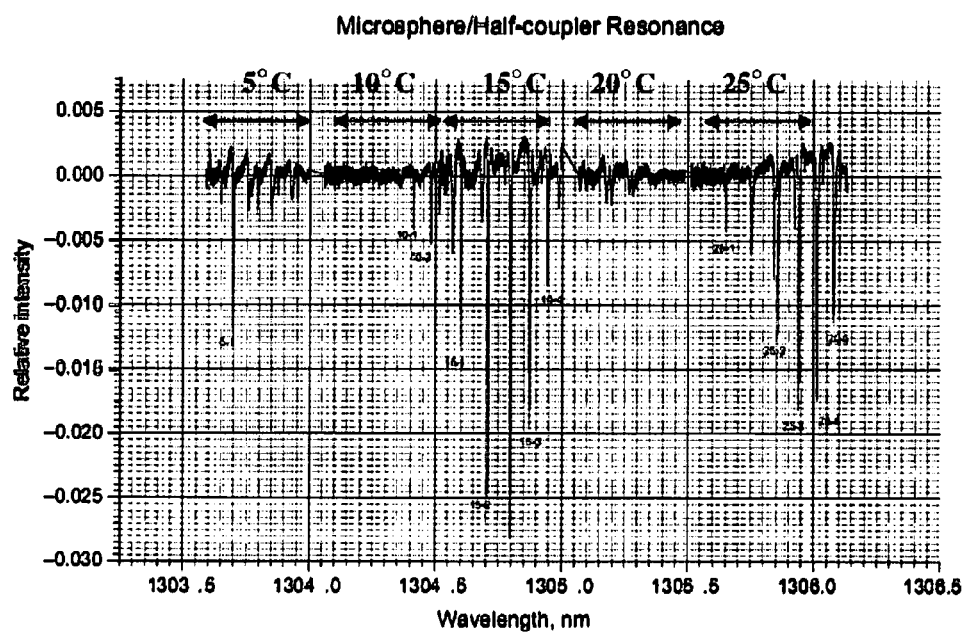
FIG. 11 is a graph illustrating resonances over extended ranges in accordance with an aspect of the innovation.

The calibration was performed at five fixed temperatures (i.e., 5° C., 10° C., 15° C., 20° C., and 25° C.) and the current was changed at each temperature. The calibration involved finding the wavelength-current relationship at every fixed laser diode temperature and continuous mapping the results, as shown in Table 1 below and graphically in FIG. 10. Further, resonances that typically occur over an extended range of wavelengths are shown in FIG. 11. Still further, FIG. 11 illustrates that the secondary resonances have a tendency to group around the fundamental ones.

TABLE 1

| Current mA | Temperature 5° C. Wavelength nm | Temperature 10° C. Wavelength nm | Temperature 15° C. Wavelength nm | Temperature 20° C. Wavelength nm | Temperature 25° C. Wavelength nm |
|---|---|---|---|---|---|
| 0 | 1303.524 | 1303.996 | 1304.472 | 1304.949 | 1305.427 |
| 20 | 1303.548 | 1304.023 | 1304.5 | 1304.978 | 1305.458 |
| 30 | 1303.576 | 1304.051 | 1304.515 | 1304.993 | 1305.49 |
| 40 | 1303.607 | 1304.084 | 1304.53 | 1305.01 | 1305.509 |

TABLE 1-continued

| Current mA | Temperature 5° C. Wavelength nm | Temperature 10° C. Wavelength nm | Temperature 15° C. Wavelength nm | Temperature 20° C. Wavelength nm | Temperature 25° C. Wavelength nm |
| --- | --- | --- | --- | --- | --- |
| 50 | 1303.641 | 1304.101 | 1304.563 | 1305.044 | 1305.527 |
| 60 | 1303.678 | 1304.119 | 1304.6 | 1305.082 | 1305.567 |
| 70 | 1303.717 | 1304.157 | 1304.639 | 1305.124 | 1305.609 |
| 80 | 1303.76 | 1304.198 | 1304.682 | 1305.168 | 1305.656 |
| 90 | 1303.806 | 1304.242 | 1304.728 | 1305.216 | 1305.705 |
| 100 | 1303.855 | 1304.29 | 1304.778 | 1305.267 | 1305.758 |
| 110 | 1303.908 | 1304.341 | 1304.831 | 1305.321 | 1305.814 |
| 120 | 1303.963 | 1304.395 | 1304.886 | 1305.379 | 1305.874 |
| 125 | 1303.992 | 1304.452 | 1304.945 | 1305.44 | 1305.936 |
| 130 | 1304.021 | 1304.512 | 1305.007 | 1305.503 | 1306.002 |
| 140 | 1304.099 | 1304.575 | 1305.073 | 1305.571 | 1306.071 |

The numbers in bold from Table 1 are used to form a calibration table for the control of the laser diode, as shown in Table 2 below.

TABLE 2

| Temperature | Current MIN, mA | Current MAX, mA | Wavelength MIN, nm | Wavelength MAX, nm |
| --- | --- | --- | --- | --- |
| 5° C. | 30 | 130 | 1303.576 | 1304.021 |
| 10° C. | 20 | 130 | 1304.023 | 1304.512 |
| 15° C. | 25 | 130 | 1304.515 | 1305.007 |
| 20° C. | 30 | 130 | 1305.01 | 1305.503 |
| 25° C. | 35 | 130 | 1305.509 | 1306.002 |

Figure 12:
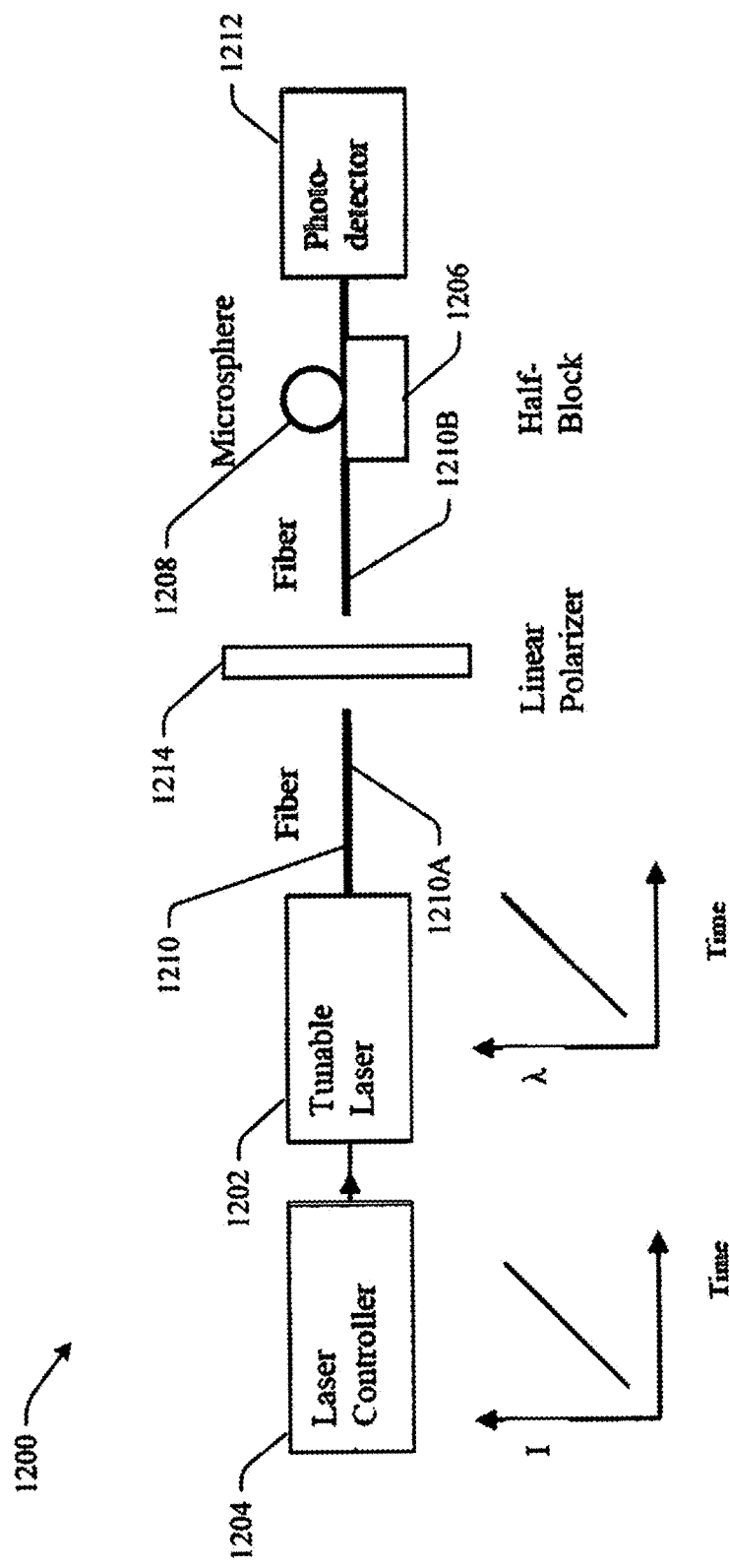
FIG. 12 shows an example apparatus used to demonstrate effects of using an optical fiber to deliver light to a microsphere incorporating the half-block coupler in accordance with an aspect of the innovation.

FIG. 12 shows an example embodiment of a device 1200 used to demonstrate effects of using a fiber to deliver light to a microsphere incorporating the half-block coupler described above. The apparatus includes a tunable laser 1202, a laser controller 1204, a half-coupler 1206 with a microsphere 1208 positioned on the top of it, a waveguide, such as but not limited to, an optical fiber 1210, and a photo-detector 1212. Electrical current from the laser controller 1204 is applied to the tunable laser 1202. The current is time dependent and as a result the wavelength of light emitted by the laser 1202 has an identical time dependency. The light is coupled into the optical fiber 1210 with the parameters described above. A linear polarizer 1214 is incorporated in the path of the light by placing it between two fibers 1210A, 1210B and aligning the fibers 1210A, 1210B to achieve the maximum coupling of light from one fiber 1210A to the other 1210B through the polarizer 1214.

The fiber 1210 used in the apparatus 1200 is a commercial grade single mode fiber specified for 1300/1550 nm wavelengths. The fiber 1210 is a standard in communication industry and has the following parameters: the core diameter 8.2 μm, refractive index difference Δ=0.36%, and the effective index of refraction 1.4677 and 1.4682 for 1310 nm and 1550 nm wavelength respectively. Calculations show that the corresponding V parameter is 2.449 and 2.071 for those respective wavelengths. Thus, the V parameter for the wavelength of 1310 nm and below is above the normalized cut-off frequency of 2.405. Technically, this arrangement is no longer a single mode operation, rather it is a two-mode case. The presence of the second mode does not practically change the propagating properties of the fiber 1210 because that mode propagates very close to the core-cladding interface and caries a very insignificant amount of power.

Figure 13:
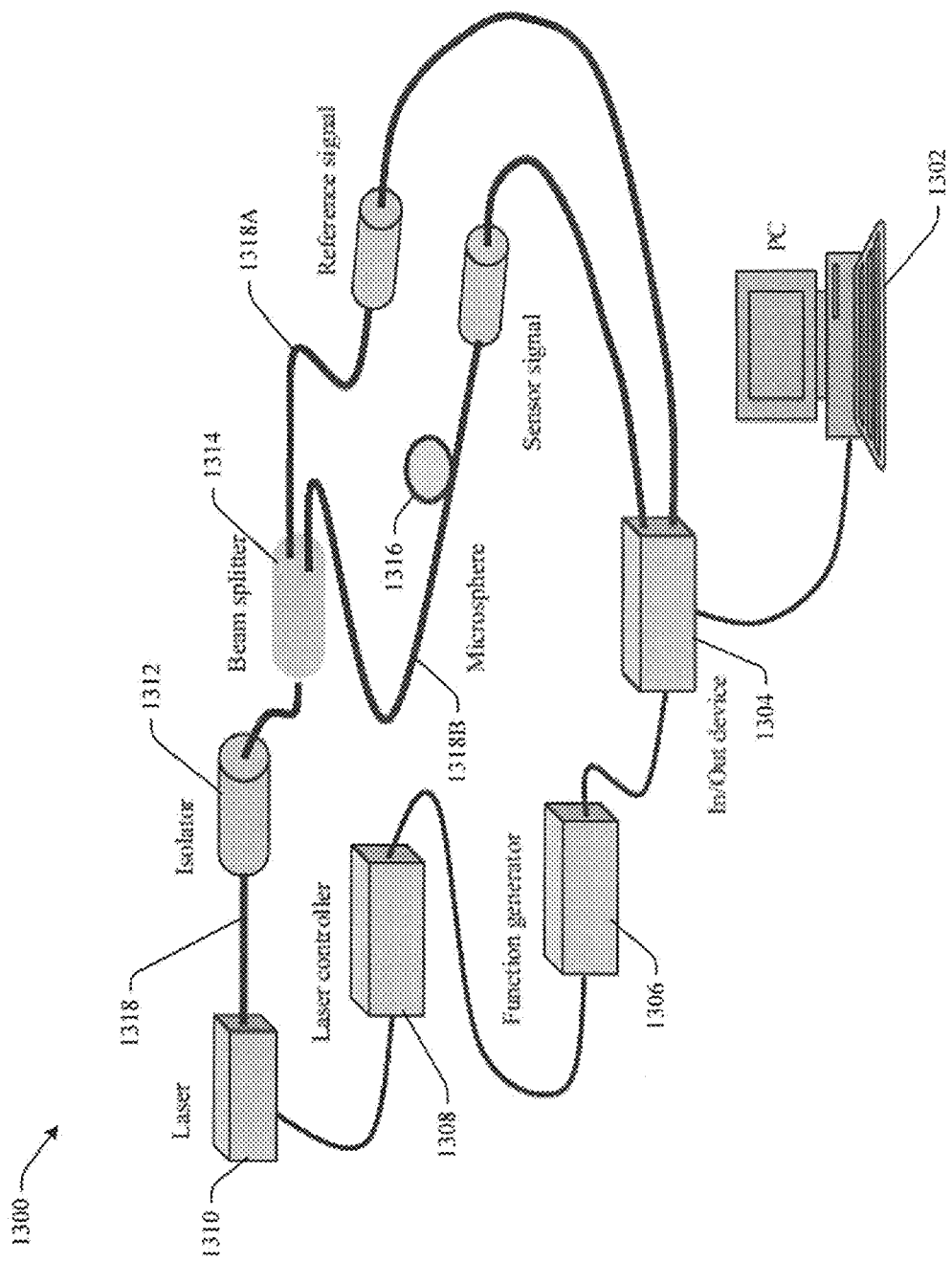
FIG. 13 is an example system incorporating the example apparatus of FIG. 12 in accordance with an aspect of the innovation.
Figure 14A:
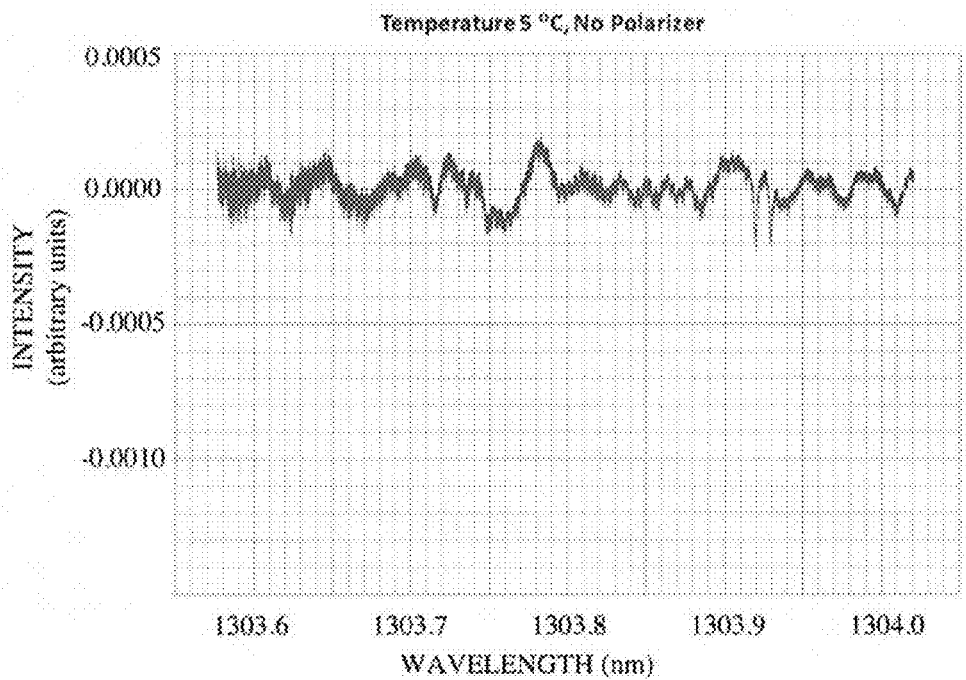
FIGS. 14A-14E are graphical illustrations of resonances obtained at a wavelength of approximately 1300 nm at different temperatures without polarization in accordance with an aspect of the innovation.
Figure 14B:
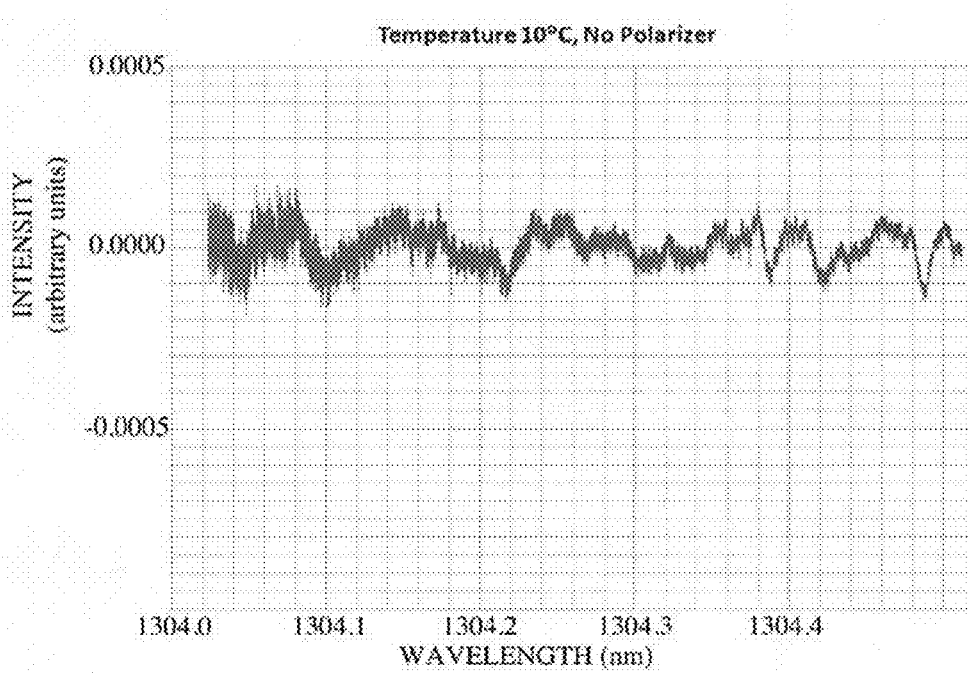
Figure 14C:
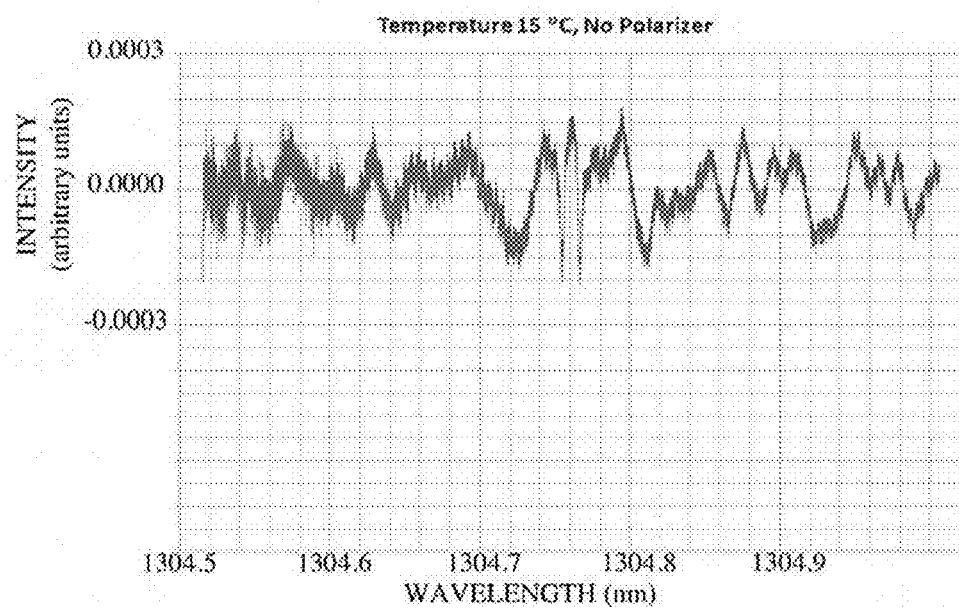
Figure 14D:
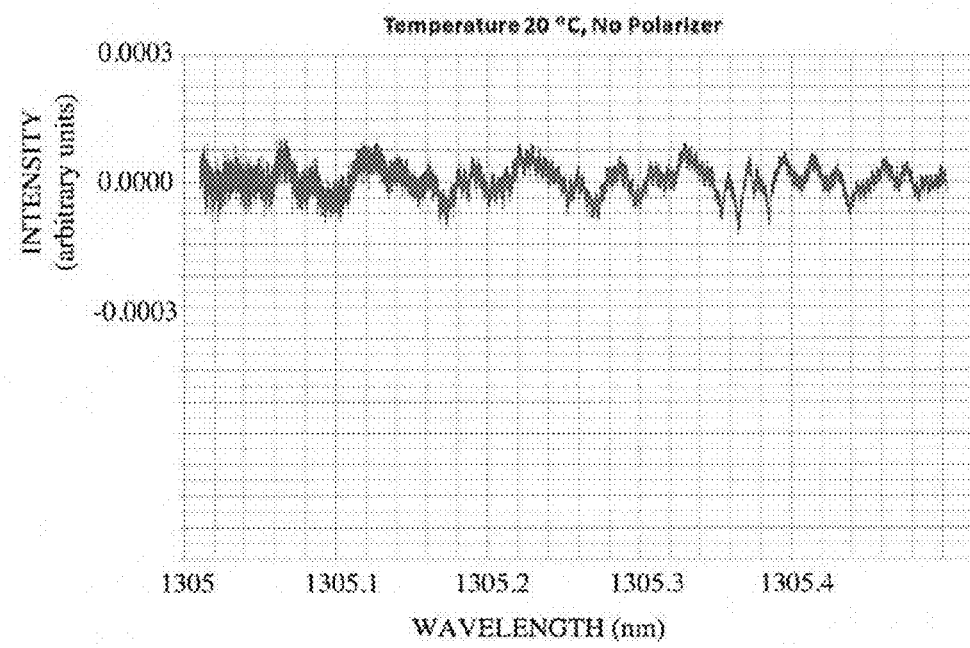
Figure 14E:
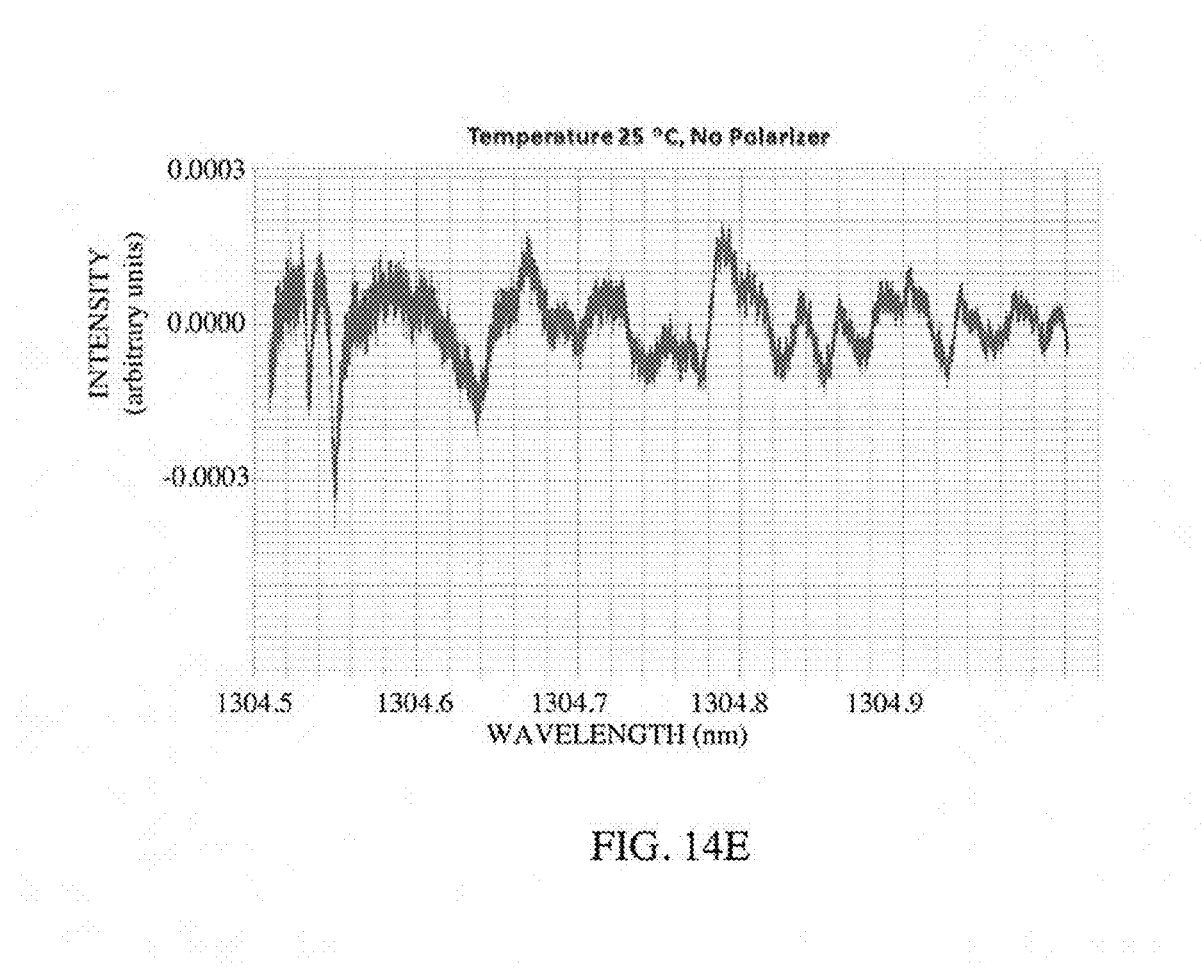
Figure 15D:
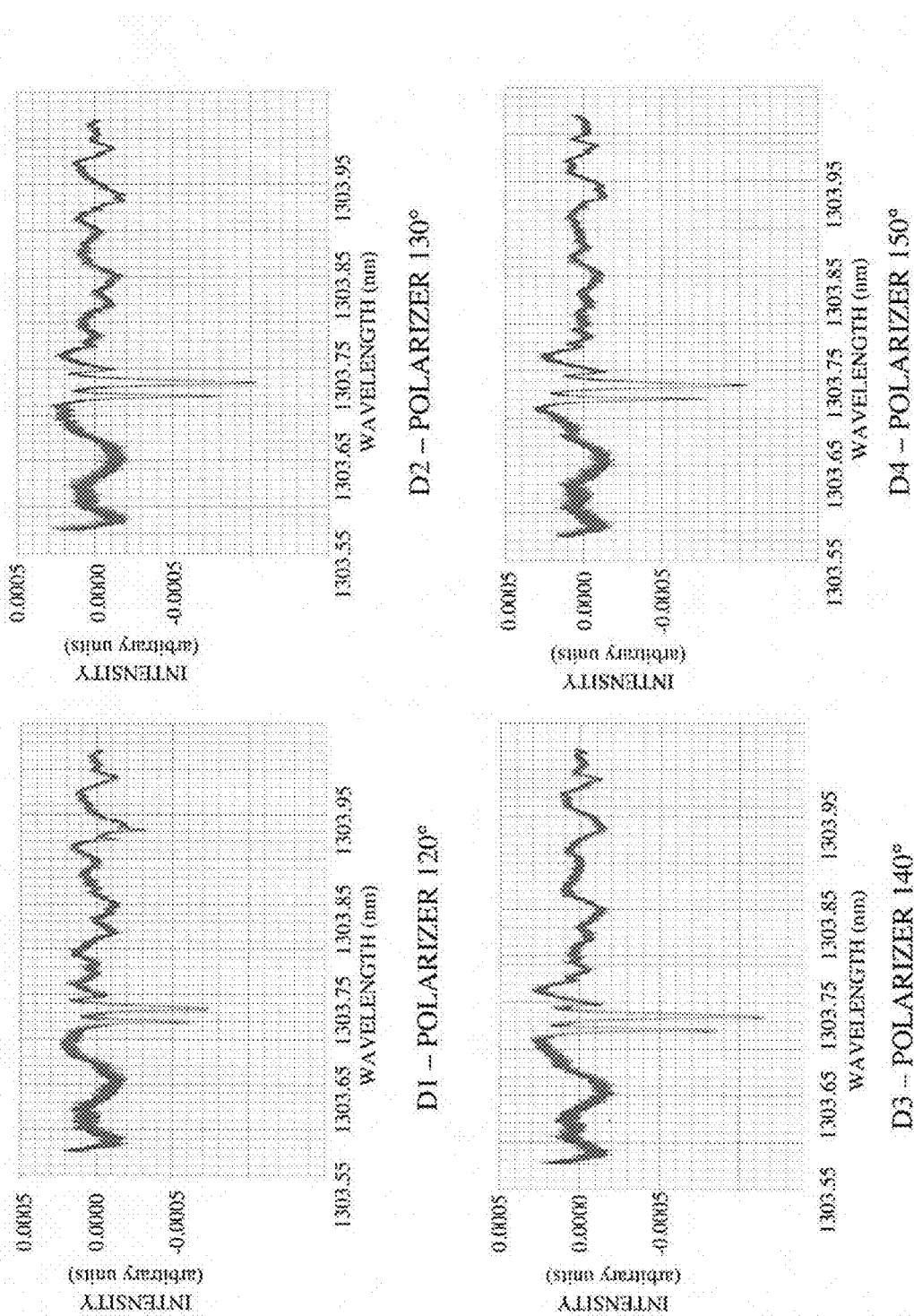
Figure 15E:
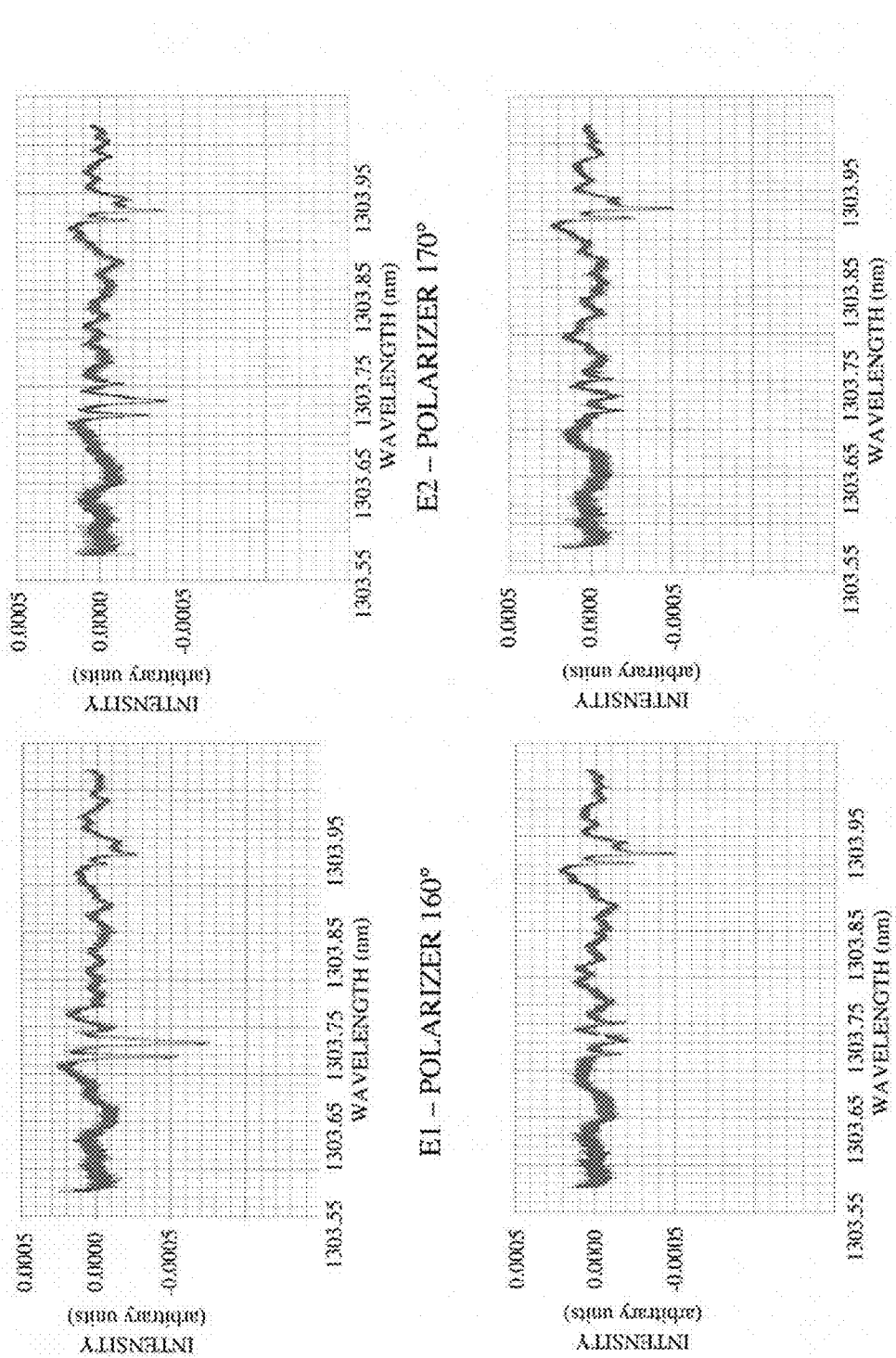
Figure 15H:
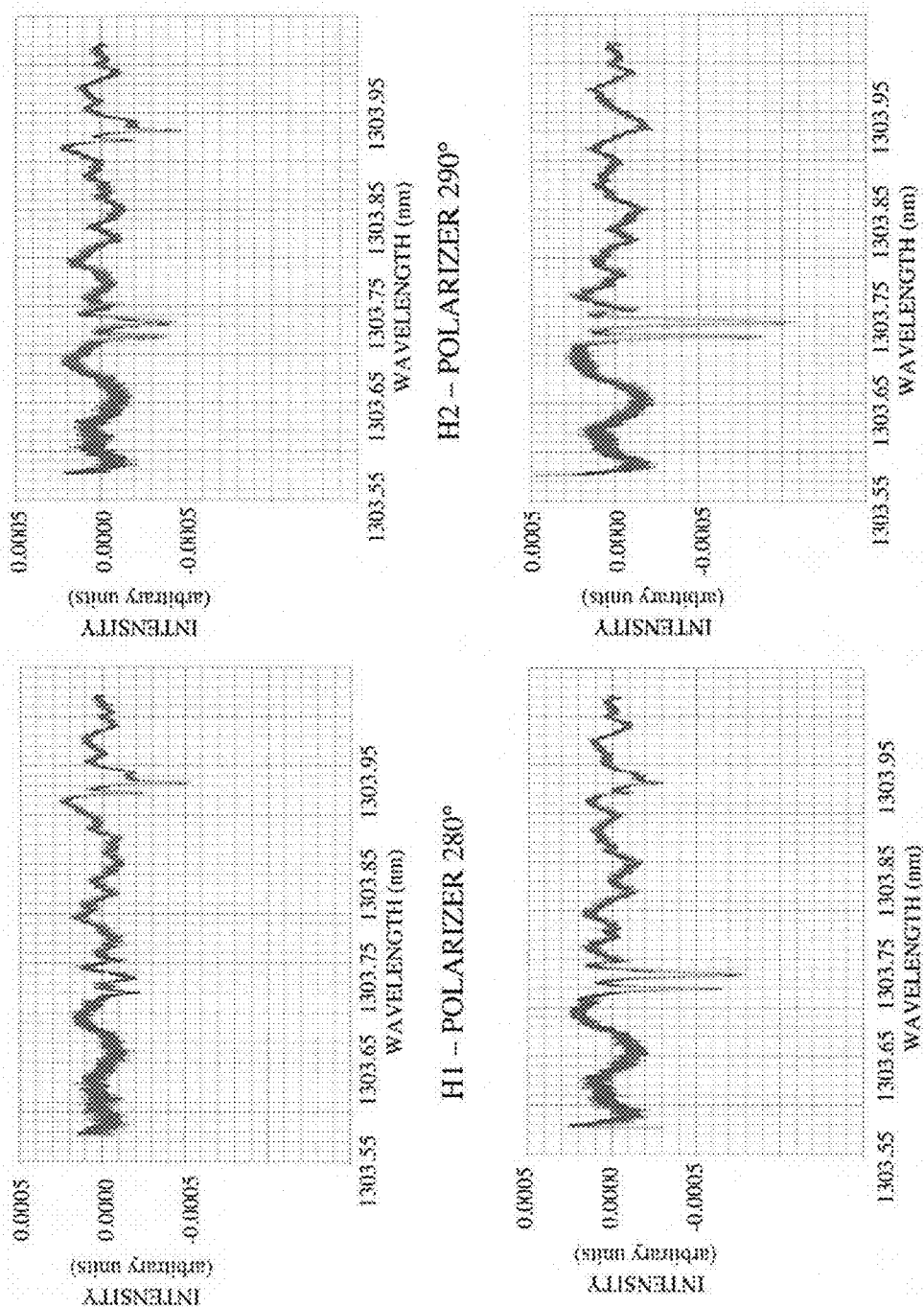
Figure 16A:
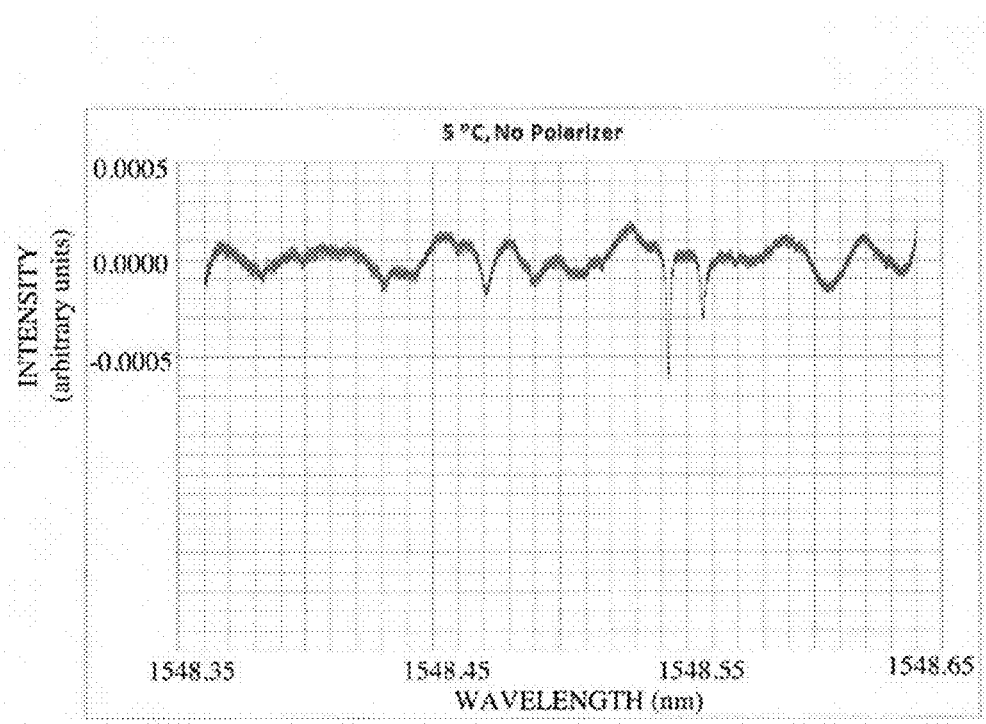
FIGS. 16A-16E are graphical illustrations of resonances obtained at a wavelength of approximately 1550 nm at different temperatures without polarization in accordance with an aspect of the innovation.
Figure 16B:
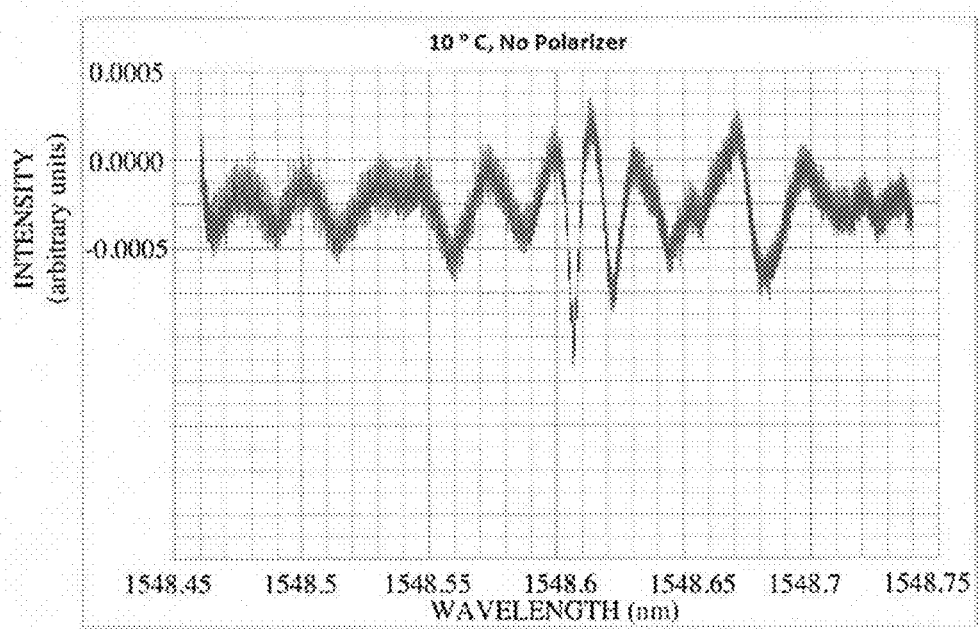
Figure 16C:
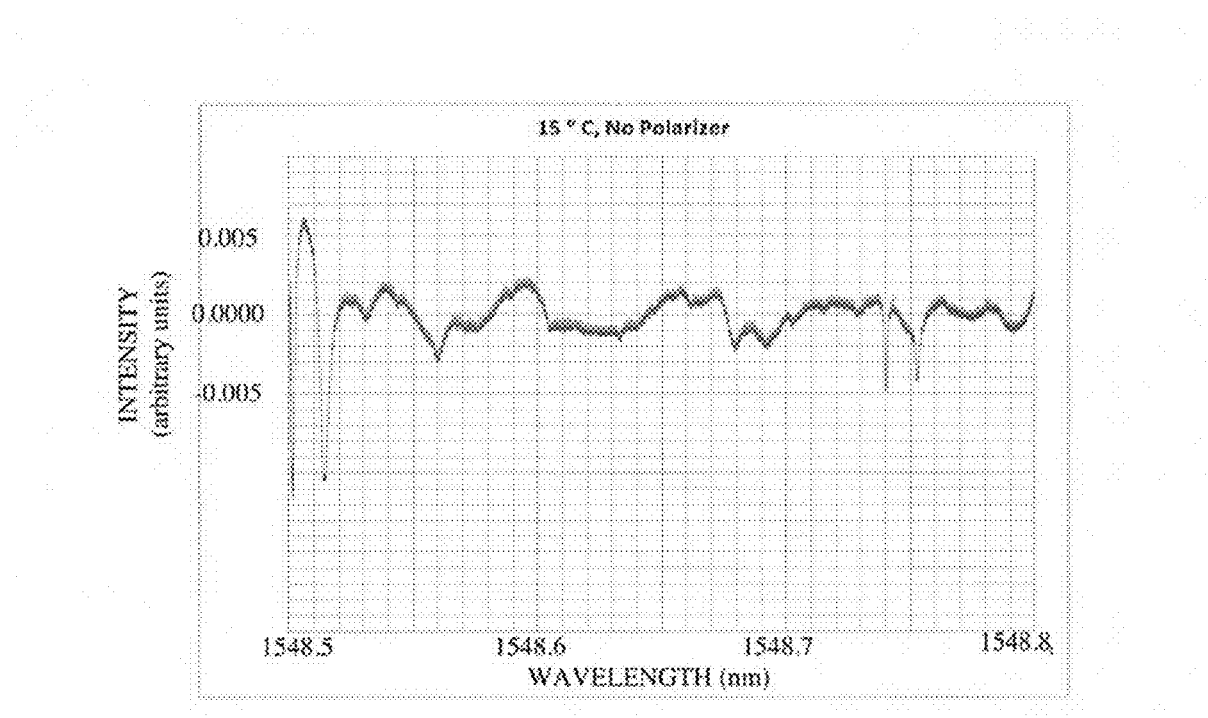
Figure 16D:
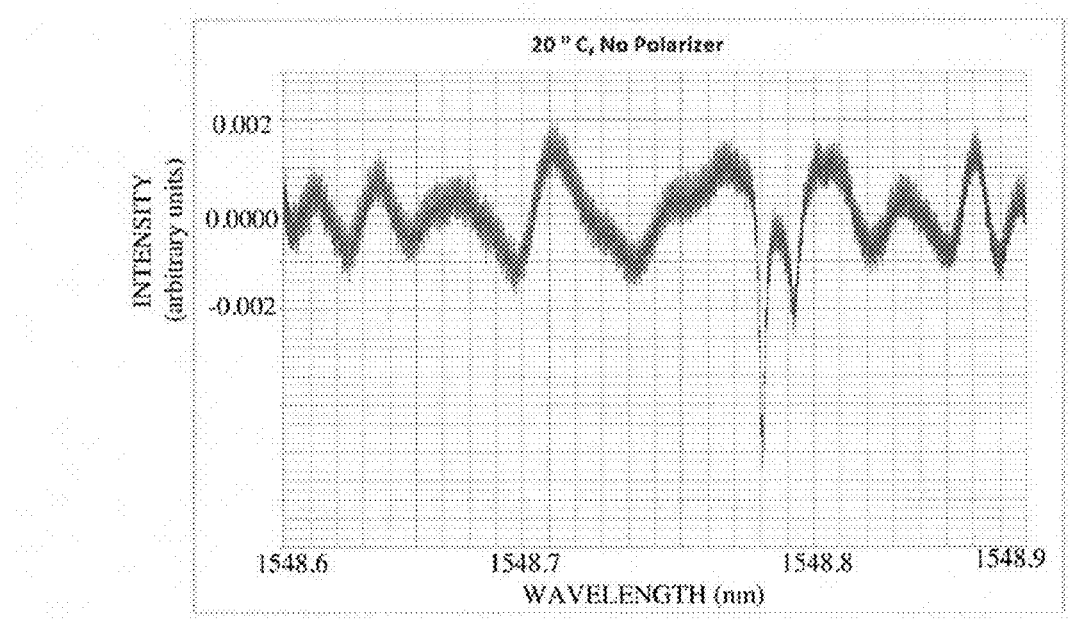
Figure 16E:
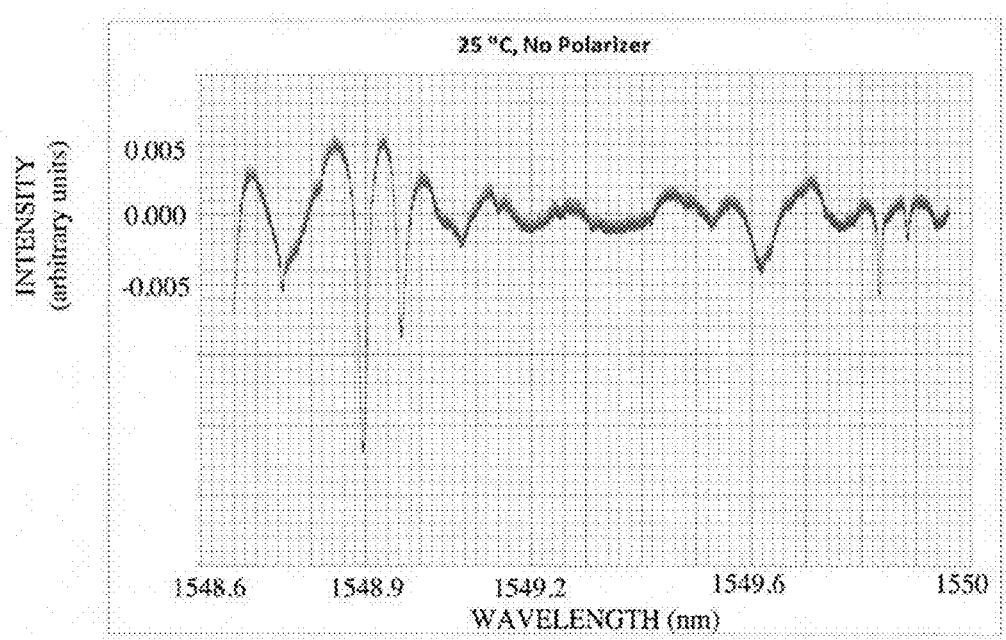
Figure 17F:
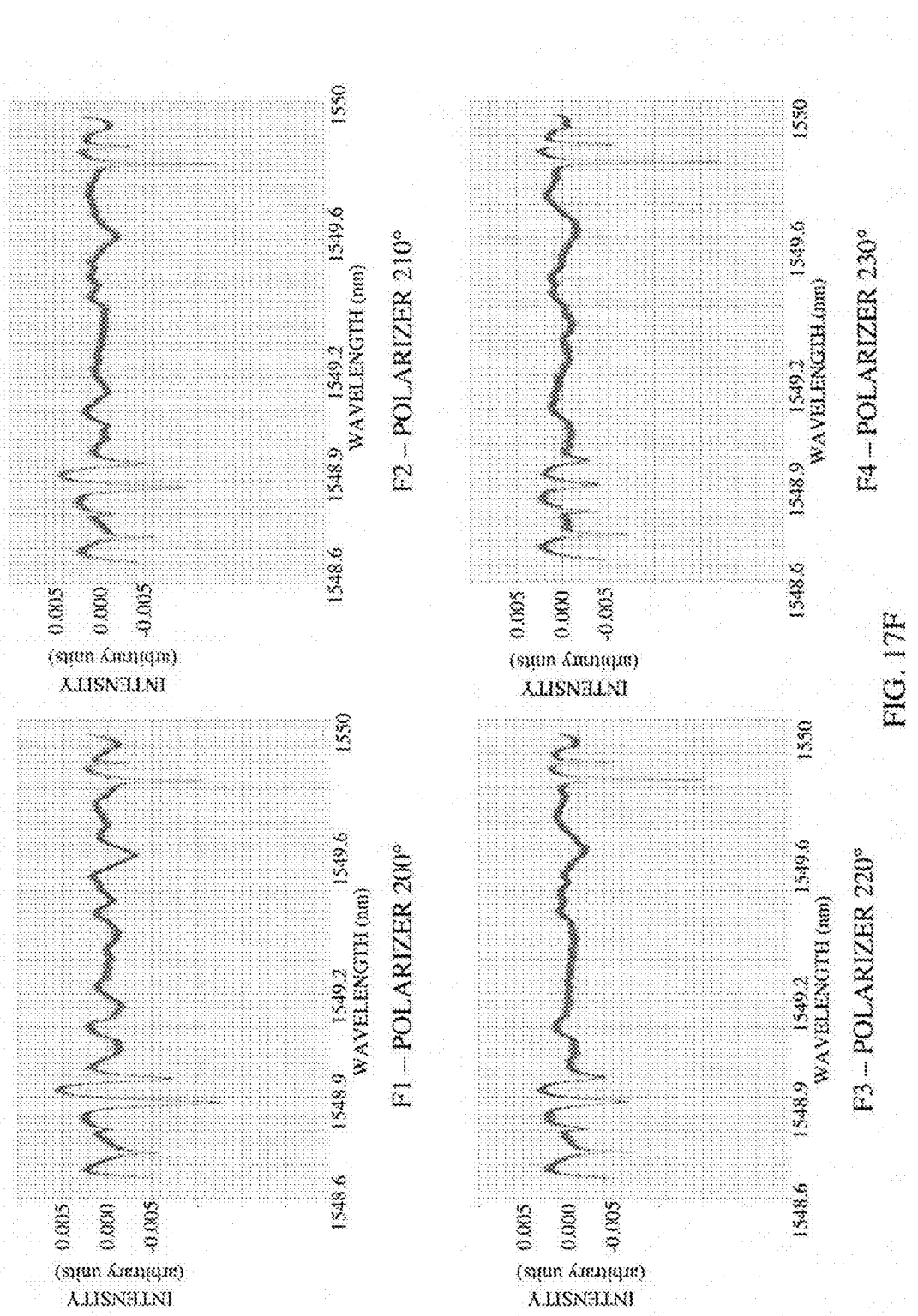
Figure 17G:
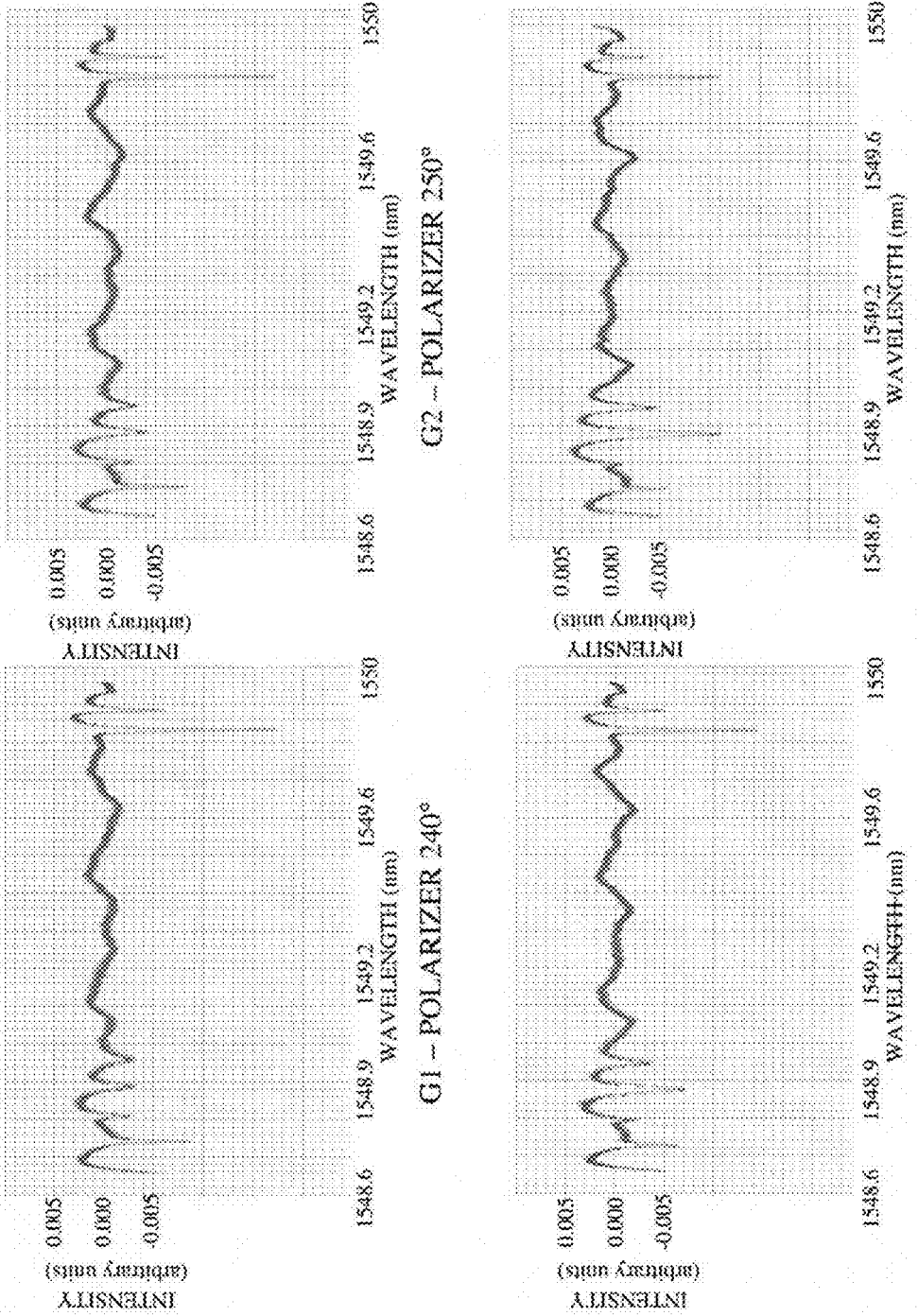

FIG. 13 is an example system 1300 incorporating the device 1200 described above. The system 1300 includes a computer (user interface) 1302 to provide control of the instrumentation and data processing capability (including resonance dip detection and tracking), an input/output device 1304 to manage incoming and outgoing signals, a function generator 1306 that provides an appropriate electronic signal profile (ramp function) into a laser controller 1308, a tunable laser 1310, an isolator 1312, an in fiber beam splitter 1314, and a microsphere 1316.

The output of the tunable laser 1310, which may be a distributed feedback (DFB) laser diode, is coupled into a single mode optical fiber 1318. The in fiber beam splitter 1310 splits the fiber 1318 into a first and second fiber 1318A, 1318B. Thus, the beam from the laser 1310 is split in two in such a manner that a small portion of the laser output is directed to a photodiode as a reference signal on the first fiber 1318A to monitor the laser intensity. The second fiber 1318B is in contact with the microsphere 1316 and serves as the optical input/output device. The output of the second fiber 1318A is connected to a fast photodiode to monitor the transmission spectrum. The transmission spectrum through the second fiber 1318A is normalized using the reference signal to remove the effects of laser output variations. The section of the fiber 1318A where the fiber 1318A is in contact with the microsphere 1316 is tapered by either etching it or by heating and stretching it, as described above. For optical coupling between the fiber 1318 and the microsphere 1316, the evanescent fields of the two elements must overlap. If the optical driver is a DFB laser, it is typically tuned by ramping the current into it using the laser controller 1308 although temperature tuning or a combination of both is also possible. The output of the photodetectors is monitored by a Digital Acquisition card driven by a host computer.

In order to demonstrate the features of the innovation, experimental data was obtained by scanning the laser wavelength through all 5 temperature segments mentioned above (i.e., 5° C., 10° C., 15° C., 20° C., and 25° C.) at a light beam wavelength of 1300 nm and 1550 nm and observing and recording resonances at each temperature segment separately. The experiment consisted of two parts. The first part was conducted without a polarization filter to observe the resonances that occurred over entire tuning range of the laser diode at all temperature regimes. The second part of the experiment was conducted with the polarizer 1214 inserted in the gap in the fiber 1210 between the laser 1202 and the microsphere 1208, see FIG. 12. The polarizer 1214 was placed in a special mount that permitted rotation of the polarizer 1214 around its optical axis. The mount has a dial with 360 angular gradations separated by 1 angular degree, which facilitates accurate rotation of the polarizer 1214. During the second part of the experiment, the polarizer was rotated in 10 degree angular increments. During both the first and second part of the experiment, data was recorded for a light beam wavelength of approximately 1300 nm and for 1550 nm.

FIGS. 14A-14E graphically illustrate the resonant plots for the 1300 nm wavelength at each temperature with no polarization and FIGS. 15A-15I represent the resonant plots for the 1300 nm wavelength with the inclusion of the polarizer 1214. For simplicity, only data recorded at the temperature of 5° C. is disclosed herein. It is to be appreciated that similar results were obtained for the remaining temperatures. The pattern in the plots in FIGS. 15A-15I, clearly shows the presence of two sets of resonances. Specifically, the second order polarization mode $LP_{11}$ is being propagated in the fiber 1210 and coupled into the microsphere 1208. The strength of the resonances varies with the angular polarization and each set appears to have a 90 degrees angular periodicity. Moreover, the sets appear to have angular positions of the polarizer 1214 that correspond to the maximum strengths of the resonances shifted by approximately 45 degrees.

FIGS. 16A-16E graphically illustrate the resonant plots for the 1550 nm wavelength at each temperature with no polarization and FIGS. 17A-17I represent the resonant plots for the 1550 nm wavelength with the inclusion of the polarizer 1214. For simplicity, only data recorded at the temperature of 5° C. is disclosed herein. It is to be appreciated that similar results were obtained for the remaining temperatures. Contrary to the plots in FIGS. 15A-15I, the resonant plots for the 1550 nm wavelength illustrate a 180 degree repeatability, which represents the lowest or fundamental mode $LP_{01}$. Thus, higher order modes are not coupled into the microsphere at higher wavelengths.

Figure 18A:
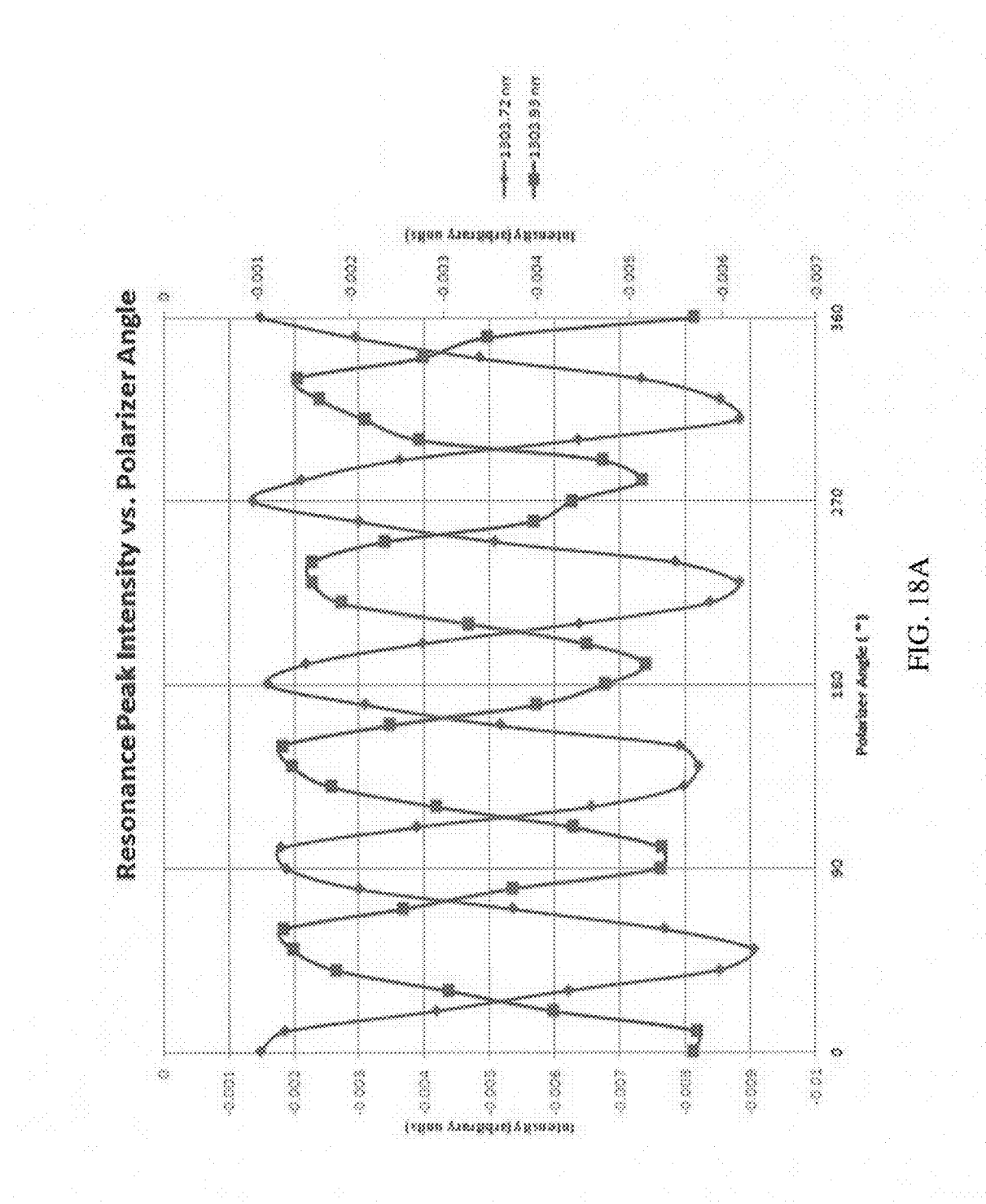
FIGS. 18A and 18B graphical illustrations representing the intensity of the resonances at the approximate wavelengths of 1300 and 1550 nm respectively as a function of the polarization angle in accordance with an aspect of the innovation.
Figure 18B:
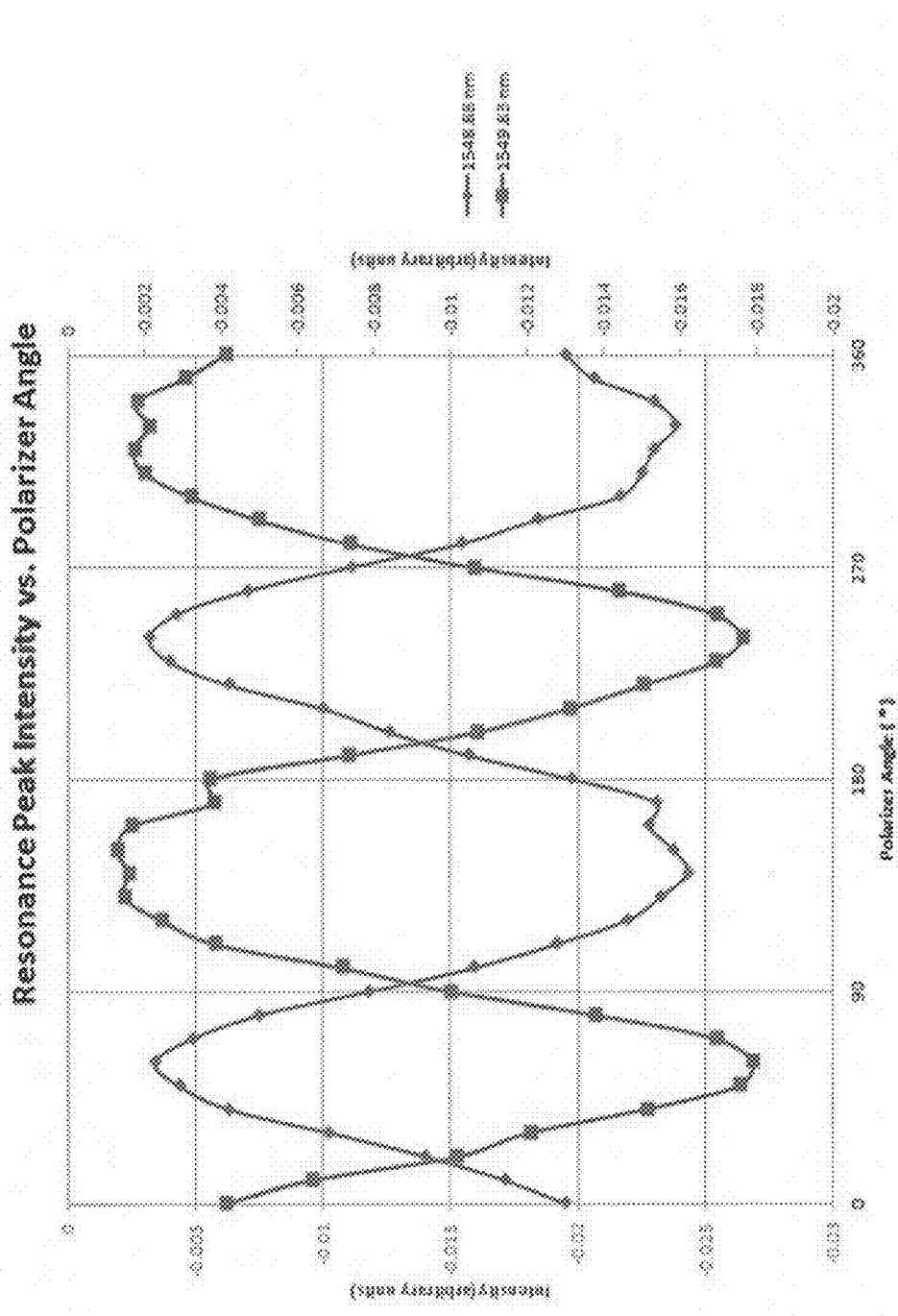

FIGS. 18A and 18B represent the intensity of the resonances at the approximate wavelengths of 1300 and 1550 nm respectively as a function of the polarization angle. Again, the plots illustrate that at the shorter wavelength of 1330 nm the second order polarization mode $LP_{11}$ is being propagated in the fiber and coupled into the microsphere, which manifests in the presence of 90 degrees repeatability (FIG. 19A). Contrarily, at 1550 nm (FIG. 19B) there is a 180 degree repeatability, which is fundamental for the lowest order polarized mode $LP_{01}$. Further, the relative strength of the peaks show a 45 degrees shift for the 1300 nm wavelength and a 90 degree shift for 1550 nm wavelength. This phenomenon is due to the microsphere removing a "degenerate" condition existing between the two mutually orthogonal polarizations of the LP modes propagating in the fiber.

The experiment demonstrates the effects of the light polarization on the strength of whispering gallery resonances in microspheres. Also demonstrated was the appearance of two sets of resonances that could be attributed to the fact that at the operating wavelengths the fiber used was not a single mode fiber, but rather two linearly polarized modes, $LP_{01}$ and $LP_{11}$ were present. The $LP_{11}$ mode propagated close to the core—cladding interface and was also coupled into the microsphere. The 90 degree symmetry in the resonance patterns could be explained by the existence of two mutually orthogonal components associated with E and H components of the electromagnetic field. The fact that the maxima in the intensities for resultant resonances in the microsphere do not occur at the same angle could be explained by the differences in the electric (and magnetic) field amplitude profiles for $LP_{01}$ and $LP_{11}$ modes.

Thus, the innovation discloses that the properties of light that reach the microsphere affect the whispering gallery resonances. In addition, the innovation also discloses that the appearance and strength of resonances depend on the polarization of the light. Various devices could be constructed based on the described phenomena. To construct these devices, however, parameters to be utilized must be identified. If these constituent parameters are affected by the environment, then a sensing device can be constructed. If the parameters change in a prescribed manner in response to actions, then a signal processing or communication device may be constructed. For instance, introduction of a linear polarizer with a controlled plane of polarization permits such functions as wavelength switching and encoding. The wavelength scanning over certain prescribed wavelength ranges permits switching from one to two LP mode operation and appearance or disappearance of a signal carried by the higher mode. A device utilizing both, the polarizer and scanning wavelength, could also be constructed.

Figure 19:
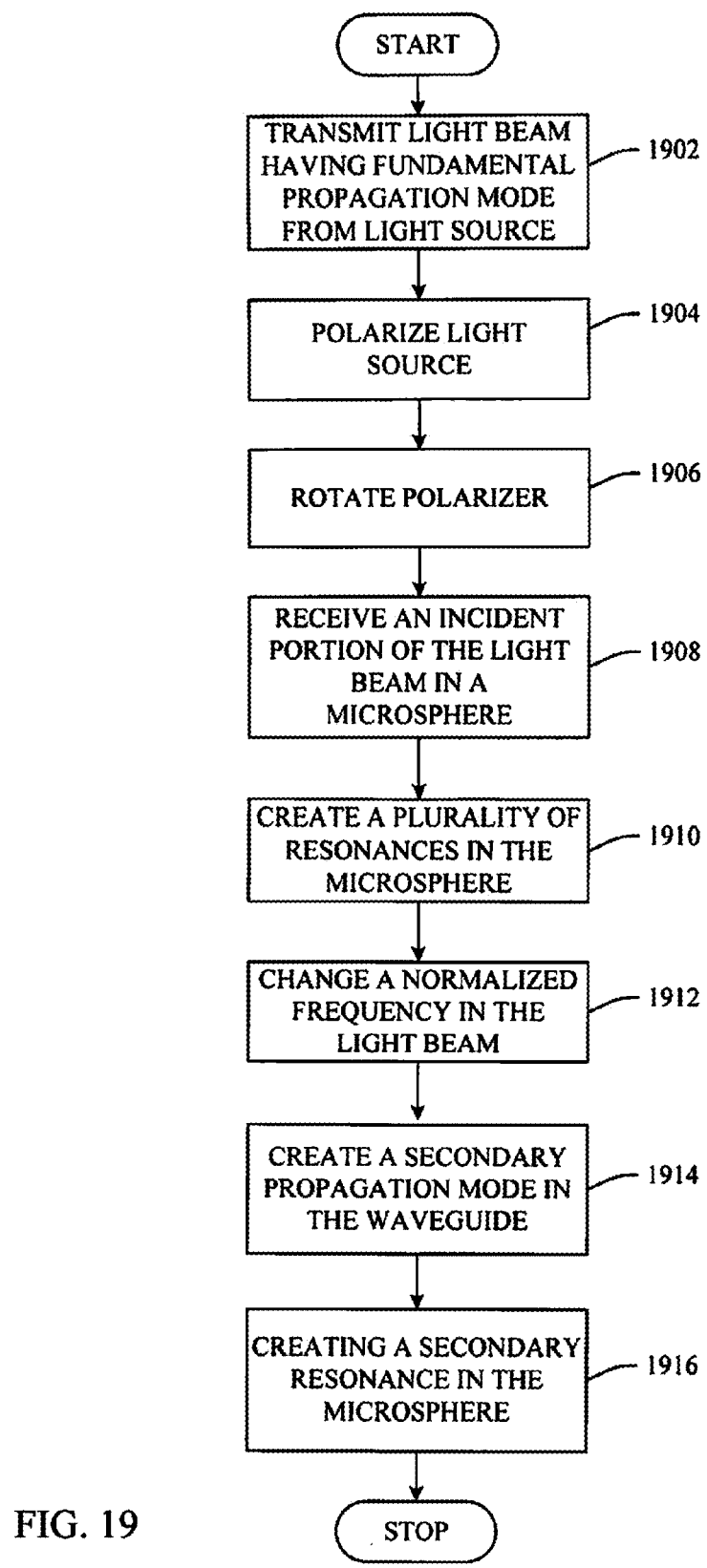
FIG. 19 is an example flow-chart illustrating a method of detecting a change in an environment in accordance with an aspect of the innovation.

Referring to FIG. 19, a method of demonstrating the operation of the tunable resonant system will be discussed. At 1902, a light beam having a fundamental propagation mode is transmitted from a light source, such as but not limited to a laser diode described above, over a waveguide, such as but not limited to an optical fiber discussed above. At 1904, the light beam is polarized with a linear polarizer and at 1906, the linear polarizer is rotated thru predetermined angular increments, as described above. At 1908, an incident portion of the transmitted light beam is received in a microsphere. At 1910, a fundamental resonance is created inside the microsphere. At 1912, a wavelength of the light beam is changed, via a change in current, thereby changing the normal frequency. At 1914, a secondary propagation mode is created in the waveguide. At 1916, a secondary resonance is created inside the microsphere. Although the method described herein relates specifically to changing the wavelength of the light beam, it is to be appreciated that the normal frequency V can be changed by changing other parameters disclosed herein that affect the normal frequency V.

The system and method of the innovation disclosed herein can create a change in a strength and/or shift in the resonances and, thus, has the capability of having unlimited applications. For example, with the availability of several LP modes spread over a range of normalized frequencies V, individual modes can be selected as separate channels for communication, sensing, data processing, etc. For example, resonant peaks inside the microsphere tend to shift when the surrounding environment changes. The innovation can act as a sensor by providing a means to bring the peak back to its original position by changing the normalized frequency. This can be done by changing the wavelength of the light beam by simply changing the current to the laser. The innovation can also act as a communication device. Specifically, rotating the polarizer by 45 or 90 degrees one resonance peak can be turned off and another can be turned on. Thus, a channel frequency can be easily switched.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to he inclusive in a manner similar to the term "comprising" as "comprising" is interpreted when employed as a transitional word in a claim.

What is claimed is:

1. A tunable resonant system, comprising:
a microsphere that receives an incident portion of a light beam generated via a light source, and wherein the light beam has a wavelength;
a waveguide that transmits the light beam from the light source to the microsphere, wherein the light beam transmitted in the waveguide forms a fundamental mode in the waveguide, wherein the waveguide has a normalized frequency; and
a polarizer disposed in a path of the waveguide between the light source and the microsphere, wherein the polarizer is rotated around its axis;
wherein a fraction of the incident portion of the light beam that forms the fundamental mode in the waveguide is coupled into the microsphere, wherein the said fraction of the incident portion of the light beam creates a set of primary resonances inside the microsphere, and
wherein a change in the normalized frequency of the waveguide creates a second order mode in the waveguide, and
wherein the second order mode in the waveguide is coupled into the microsphere and creates a set of secondary resonances inside the microsphere.

2. The tunable resonant system of claim 1, wherein a change in a current to the light source causes a change to the normalized frequency.

3. The tunable resonant system of claim 1, wherein a change in a radius of the waveguide causes a change to the normalized frequency.

4. The tunable resonant system of claim 1, wherein a change in a refractive index of the waveguide causes a change to the normalized frequency.

5. The tunable resonant system of claim 1, wherein the polarizer is rotated in a predetermined angular increment.

6. The tunable resonant system of claim 5, wherein the predetermined angular increment is 10 degrees.

7. The tunable resonant system of claim 1, wherein a portion of the waveguide is in contact with the microsphere, and wherein the portion of the waveguide in contact with the microsphere is thinned by etching or by heating and stretching that facilitates coupling between the waveguide and the microsphere.

8. The tunable resonant system of claim 1, wherein the waveguide is an optical fiber.

9. The tunable resonant system of claim 1, wherein a refractive index of the microsphere is larger than a refractive index of the waveguide.

10. The tunable resonant system of claim 1, wherein the light source is a laser diode.

11. A method of operating a tunable resonant system comprising:
transmitting a light beam from a light source over a waveguide, the light beam having a fundamental propagation mode;
receiving an incident portion of the transmitted light beam in a microsphere;
creating a fundamental resonance inside the microsphere;
changing a normalized frequency of the waveguide;
creating a secondary propagation mode in the waveguide; and
creating a secondary resonance in the microsphere.

12. The method of claim 11 further comprising polarizing the light beam with a polarizer and rotating the polarizer in predetermined angular increments.

13. The method of claim 12 further comprising changing a strength and/or a shift in the plurality of resonances and detecting a change in the strength and/or shift in the plurality of resonances.

14. The method of claim 11, wherein changing a normalized frequency of the light beam comprises changing a current to the light source.

15. The method of claim 11, wherein changing a normalized frequency of the waveguide comprises changing a radius of the waveguide.

16. The method of claim 11, wherein changing a normalized frequency of the waveguide comprises changing a refractive index of the waveguide.

17. The method of claim 11, wherein a portion of the waveguide is in contact with the microsphere, and wherein the portion of the waveguide in contact with the microsphere is thinned by etching or by heating and stretching that facilitates coupling between the waveguide and the microsphere.

18. A tunable resonant system comprising:
a user interface that provides instrumentation and data processing control to establish an electronic signal profile via a user specification;
a laser for emitting a light beam;
a laser controller that receives the electronic signal profile and facilitates transmission of a light beam from the laser having a fundamental propagation mode in accordance with the electronic signal profile;
an optical fiber that carries the transmitted light beam;
a beam splitter that splits the optical fiber into a plurality of optical fibers, a portion of the light beam being transmitted over each of the plurality of optical fibers; and
a microsphere disposed on one of the plurality of optical fibers and receives an incident light beam from the portion of light beam transmitted on the one of plurality of optical fibers thereby causing a fundamental resonance in the microsphere,
wherein a change in a normalized frequency of one of the plurality of optical fibers on which the microsphere is disposed creates a secondary mode in the optical fiber, and
wherein the secondary mode creates a secondary resonance inside the microsphere.

19. The tunable resonant system of claim 18, wherein the portion of the light beam transmitted on another one of the plurality of optical fibers serves as a reference signal that monitors the intensity of the laser.

20. The tunable resonant system of claim 18, wherein a change in a current to the light source and/or a change in a radius of the optical fiber and/or a change in a refractive index of the optical fiber causes a change to the normalized frequency.

* * * * *